US005877704A

United States Patent [19]

Yoshida

[11] Patent Number: 5,877,704

[45] Date of Patent: Mar. 2, 1999

[54] PARKING-SITE RESERVATION CONTROL SYSTEM

[75] Inventor: Ichiro Yoshida, Takahama, Japan

[73] Assignee: Denso Corporation, Kariya, Japan

[21] Appl. No.: 883,230

[22] Filed: Jun. 26, 1997

[30] Foreign Application Priority Data

Jun. 28, 1996 [JP] Japan .................................... 8-170164

[51] Int. Cl.[6] ....................................................... B60Q 1/48

[52] U.S. Cl. ........................ 340/932.2; 340/905; 340/928; 340/990; 340/995; 235/384; 701/202; 701/209

[58] Field of Search ................................ 349/932.2, 990, 349/991, 995, 905, 928; 235/384, 380; 701/202, 212, 211, 208, 209

[56] References Cited

U.S. PATENT DOCUMENTS

| | | | |
|---|---|---|---|
| 5,004,997 | 4/1991 | Shisgal et al. | 340/932.2 |
| 5,091,727 | 2/1992 | Mahmood | 340/932.2 |
| 5,103,400 | 4/1992 | Yamada et al. | 340/995 |
| 5,182,555 | 1/1993 | Sumner | 340/905 |
| 5,187,810 | 2/1993 | Yoneyama et al. | 340/991 |
| 5,257,023 | 10/1993 | Furuya | 340/995 |
| 5,289,183 | 2/1994 | Hassett et al. | 340/991 |
| 5,339,000 | 8/1994 | Bashan et al. | 340/932.2 |
| 5,414,624 | 5/1995 | Anthonyson | 340/932.2 |
| 5,432,508 | 7/1995 | Jackson | 340/932.2 |
| 5,473,318 | 12/1995 | Martel | 340/932.2 |
| 5,504,314 | 4/1996 | Farmont | 340/932.2 |
| 5,565,874 | 10/1996 | Rode | 340/990 |
| 5,568,390 | 10/1996 | Hirota et al. | 340/995 |
| 5,610,821 | 3/1997 | Gazis et al. | 340/995 |
| 5,612,882 | 3/1997 | LeFebre et al. | 340/995 |

FOREIGN PATENT DOCUMENTS

| | | |
|---|---|---|
| 646897A2 | 5/1995 | European Pat. Off. . |
| 404267500A | 9/1992 | Japan . |
| 406019929A | 1/1994 | Japan . |
| 6-68396 | 3/1994 | Japan . |
| 40702142A | 1/1995 | Japan . |
| 408329389A | 12/1996 | Japan . |
| 408329390A | 12/1996 | Japan . |

*Primary Examiner*—Nina Tong
*Attorney, Agent, or Firm*—Pillsbury Madison & Sutro LLP

[57] ABSTRACT

To enable placement of a reservation at a parking site even from a remote site, communication is performed between an overhead road device disposed above a road and a vehicle-mounted device installed on a vehicle, and placement of a reservation at a parking site is performed in an integrated control computer. The integrated control computer is connected to several parking-site control computers, obtains parking-site information indicating a state of usage of a parking site from the parking-site control computers, controls the state of usage of respective parking sites, and at a time when a reservation at a parking site has been made, transmits information thereof to the parking-site control computer designated for the reservation.

30 Claims, 23 Drawing Sheets

FIG. 4

| No. | PARKING LOT ID | X-COORD. | Y-COORD. | USE CONDITION | COLOR | COLOR NUMBER |
|---|---|---|---|---|---|---|
| 1 | 120 | 30 | 90 | FULL | RED | 2 |
| 2 | 127 | 90 | 90 | ALMOST FULL | YELLOW | 1 |
| 3 | 103 | 50 | 25 | EMPTY | BLUE | 0 |

| No. | ROAD ID | X-COORD. | Y-COORD. | X-COORD. | Y-COORD. | TRAFFIC CONDITION | COLOR | COLOR NUMBER |
|---|---|---|---|---|---|---|---|---|
| 1 | 1002 | 30 | 0 | 30 | 100 | O.K. | WHITE | 0 |
| 2 | 1003 | 50 | 0 | 50 | 100 | BAD FLOW | YELLOW | 1 |
| 3 | 1010 | 90 | 0 | 90 | 100 | CONGESTED | RED | 2 |
| 4 | 1023 | 0 | 25 | 100 | 25 | BAD FLOW | YELLOW | 1 |
| 5 | 1040 | 0 | 50 | 100 | 50 | CONGESTED | RED | 2 |
| 6 | 1033 | 0 | 80 | 100 | 80 | CONGESTED | RED | 2 |

PARKING-SITE RESERVATION CONTROL SYSTEM

CROSS-REFERENCE TO RELATED APPLICATION

This application is related to Japanese Patent Application No. Hei 8-170164, incorporated herein by reference.

BACKGROUND OF THE INVENTION

Field of the Invention

This invention relates to a parking-site reservation control system for performing reservation of a parking site.

Description of Related Art

In recent years, advisory signs indicating a state of usage of parking sites have been erected along roadways in urban areas.

However, there may be cases where even when a parking site with free space according to such an advisory sign is approached, the free space may have already become unavailable due to occupation by another vehicle.

Additionally, even when a state of usage of parking sites can be ascertained through such advisory signs, the state of congestion of a roadway leading to such a parking site is not known, and so there exists a problem in that determination of which parking site to use is difficult.

SUMMARY OF THE INVENTION

In light of the foregoing problems, it is a first object of the present invention to enable placement of a reservation at a parking site even from a remote site.

It is a second object of the present invention to provide information on the status of a roadway to a destination parking site, giving consideration to a state of congestion of the roadway to the parking site, and as a result thereof, to enable placement of a reservation at an easily reachable parking site.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 shows a data structure of information for display use which an overhead road device transmits to a vehicle-mounted device in the embodiment;

DETAILED DESCRIPTION OF THE PRESENTLY PREFERRED EXEMPLARY EMBODIMENTS

An embodiment of this invention will be described hereinafter with reference to the drawings.

Figure 1:
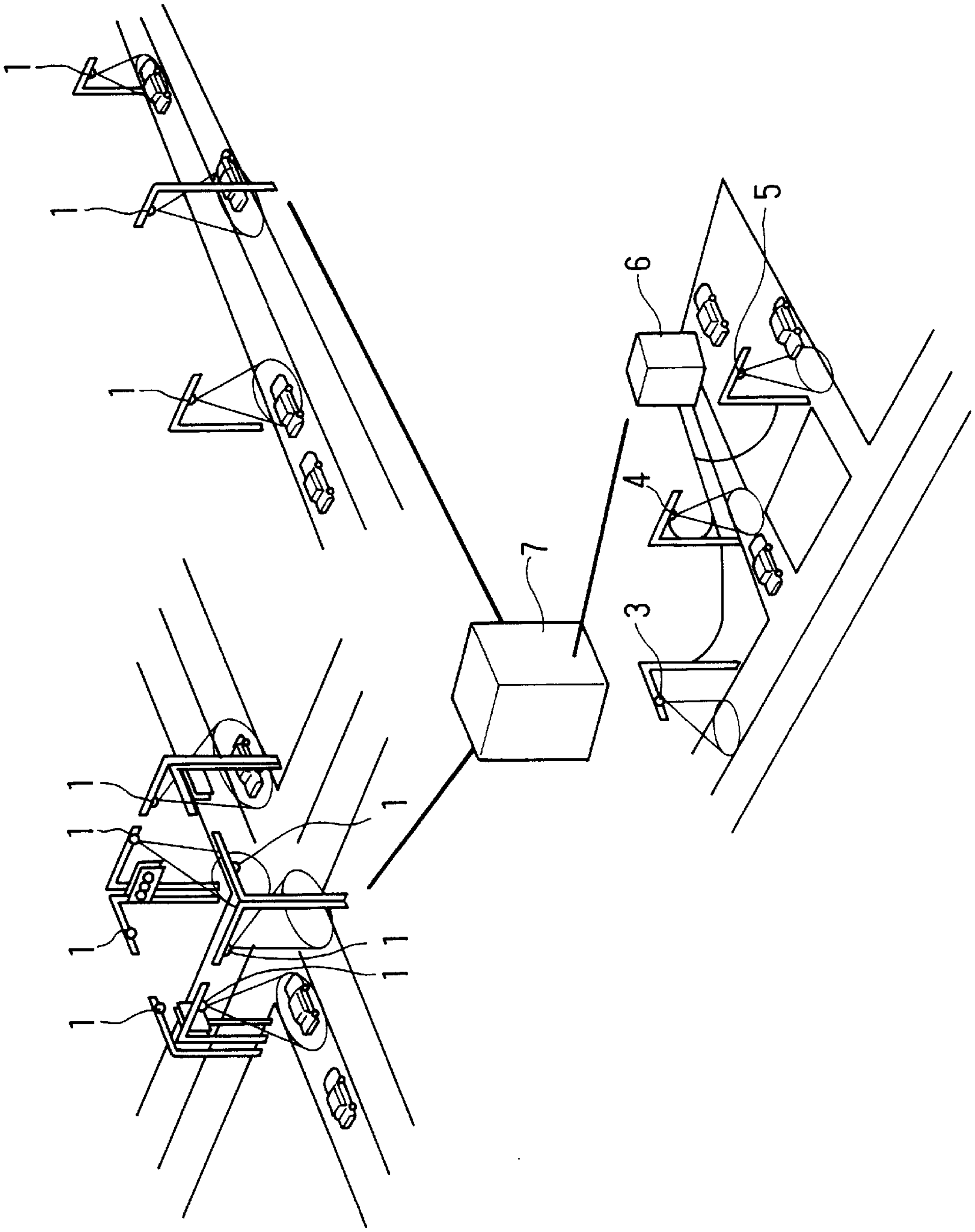
FIG. 1 is an overall structural view of a parking-site reservation control system according to a preferred embodiment of the present invention.
Figure 2:
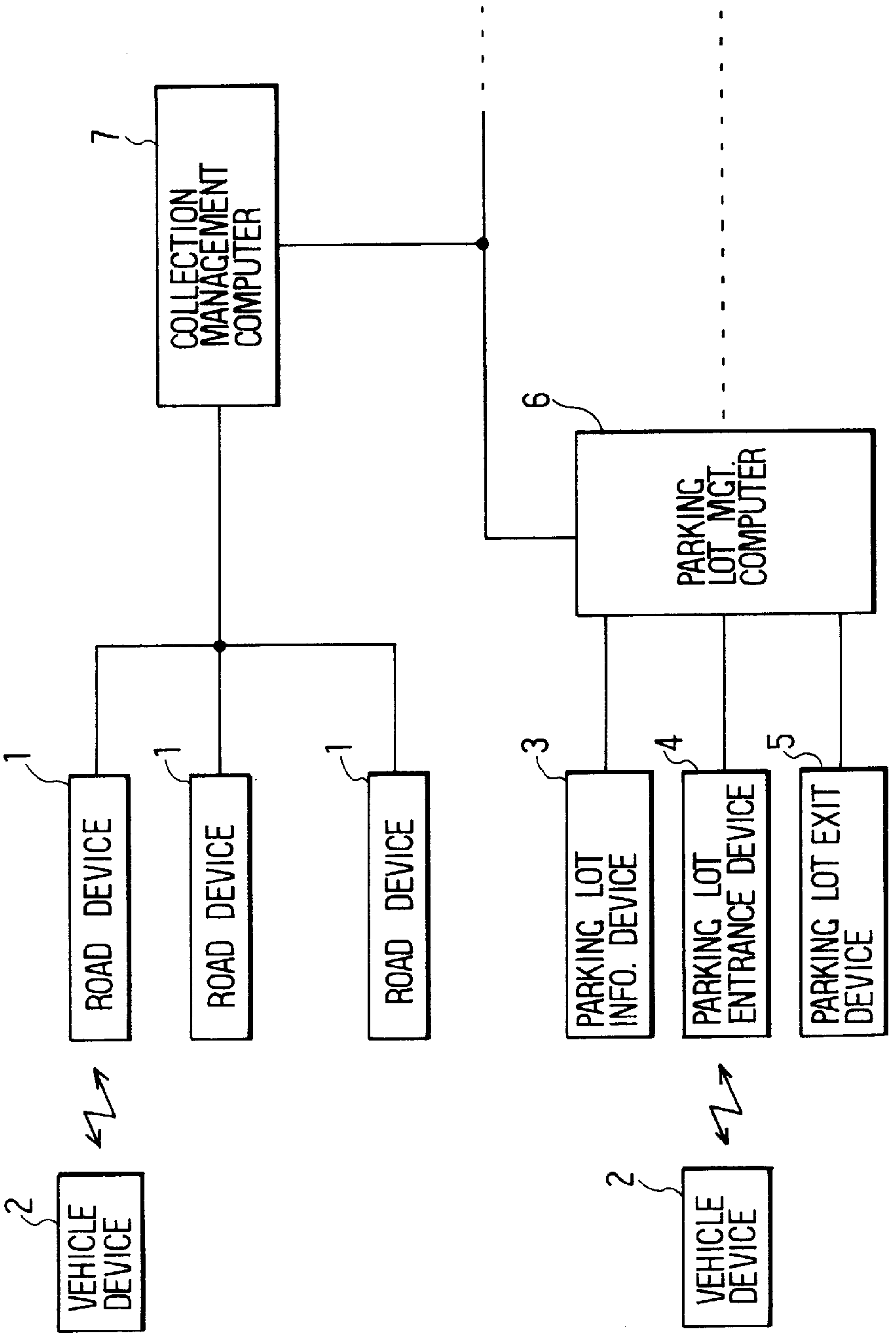
FIG. 2 is a block diagram of the parking-site reservation control system shown in FIG. 1.

FIG. 1 depicts an overall structural view of a parking-site reservation control system relating to the present invention. FIG. 2 shows the block structure of the parking-site reservation control system shown in FIG. 1.

In FIG. 1, L-shaped masts are disposed at suitable intervals along a road, and an overhead road device 1 is disposed at a location above a vehicle lane of the L-shaped masts. The overhead road device 1 is provided with an antenna, and a communication area is established beneath the overhead road device 1, as shown in FIG. 1. When a vehicle passes within this communication area, communication is performed between a vehicle-mounted device 2 installed on the vehicle and the overhead road device 1.

In a parking site, overhead devices 3 through 5 are disposed respectively at a parking-site advisory location, parking-site entrance, and parking-site exit, and communication with the vehicle-mounted device 2 installed on a vehicle is performed in the respective communication areas of the overhead devices.

A parking-site control computer 6 also is installed at the parking site. This parking-site control computer 6 supplies the respective overhead devices with information required for the respective overhead devices to communicate with the vehicle-mounted device 2 installed on a passing vehicle, and along with this, collects information that the respective overhead devices 1 have received from the vehicle-mounted device 2. Furthermore, the parking-site control computer 6 detects vehicles passing the entrance and the exit of the parking site using the vehicle sensors and the like, and manages the state of usage of the parking site on the basis of the number of vehicles which have entered the parking site and the number of vehicles which have passed through the parking-site exit.

A parking-site control computer 6 disposed at each parking site communicates with an integrated control computer 7 by, e.g., a dedicated line connection, radio or satellite communication. The integrated control computer 7 obtains parking-site information indicating a state of usage of a parking site from the parking-site control computer 6, and supplies this information to the respective overhead road device 1. Additionally, this integrated control computer 7 obtains traffic information from an external system for providing traffic information such as a VICS (Vehicle Information Communication System), prepares congestion information indicating a state of congestion of roads to respective parking sites, and supplies the congestion information to the several overhead road devices 1.

The overhead road device 1 obtains parking-site information and congestion information from the integrated control computer 7, prepares information for display use (i.e., display data) for causing a parking-site usage state and a road congestion state to be displayed, and sends this information for display use to the vehicle-mounted device 2.

The vehicle-mounted device 2 is made up of a communicating apparatus for performing communication with an overhead device, a display apparatus for displaying various information required for parking-site reservation and the like, various operation buttons operated when placing a reservation for a parking site, an IC card for recording various information, a control apparatus for performing control of these, a power-supply circuit, and so on.

Figure 3:
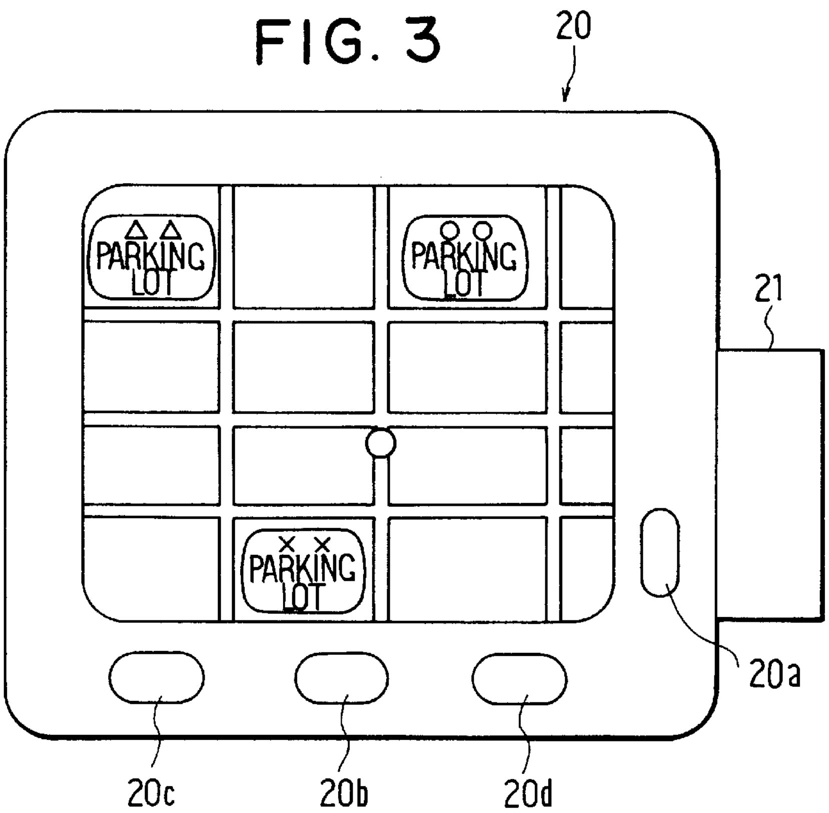
FIG. 3 shows an external view of a vehicle-mounted device used in the embodiment.

FIG. 3 shows an external view of the vehicle-mounted device 2. The vehicle-mounted device 2 has a display apparatus 20 and is structured so that an IC card 21 can be inserted therein. Various operation buttons **20*a* through 20*d* are disposed on the outer periphery of the display apparatus 20**, as shown in the drawing.

The display apparatus 20 performs display for parking-site reservation as shown in the drawing when information for display use is received from the overhead road device 1. That is to say, the location of the parking site is displayed, usage states thereof are displayed in respective colors, and congestion states of roads to respective parking sites are displayed in respective colors. The circle in the display shown in the drawing shows the present location where the overhead road device 1 is installed. A parking site to be used can easily be decided on based on the present location with a display such as this.

As shown in FIG. 4, the overhead road device 1 prepares a parking-site ID, X and Y coordinates thereof, and a color number indicating a state of usage thereof, as well as a road ID, X and Y coordinates thereof, and a color number indicating a state of congestion thereof (the portions enclosed by solid lines in the drawing), and transmits display-use information according to these to the vehicle-mounted device 2.

As shown in FIG. 3, the vehicle-mounted device 2 is provided with a "Reserve" button **20*a*, an "OK" button 20*b*, a "Select" button 20*c*, and a "Cancel" button 20*d*, and reservation of a parking site can be performed using these. The "Reserve" button 20*a* is a thrown-position retaining type button, and the "OK" button 20*b*, the "Select" button 20*c*, and the "Cancel" button 20*d*** are self-returning type buttons. The reservation of a parking site using this device will be described hereinafter.

Figure 5A:
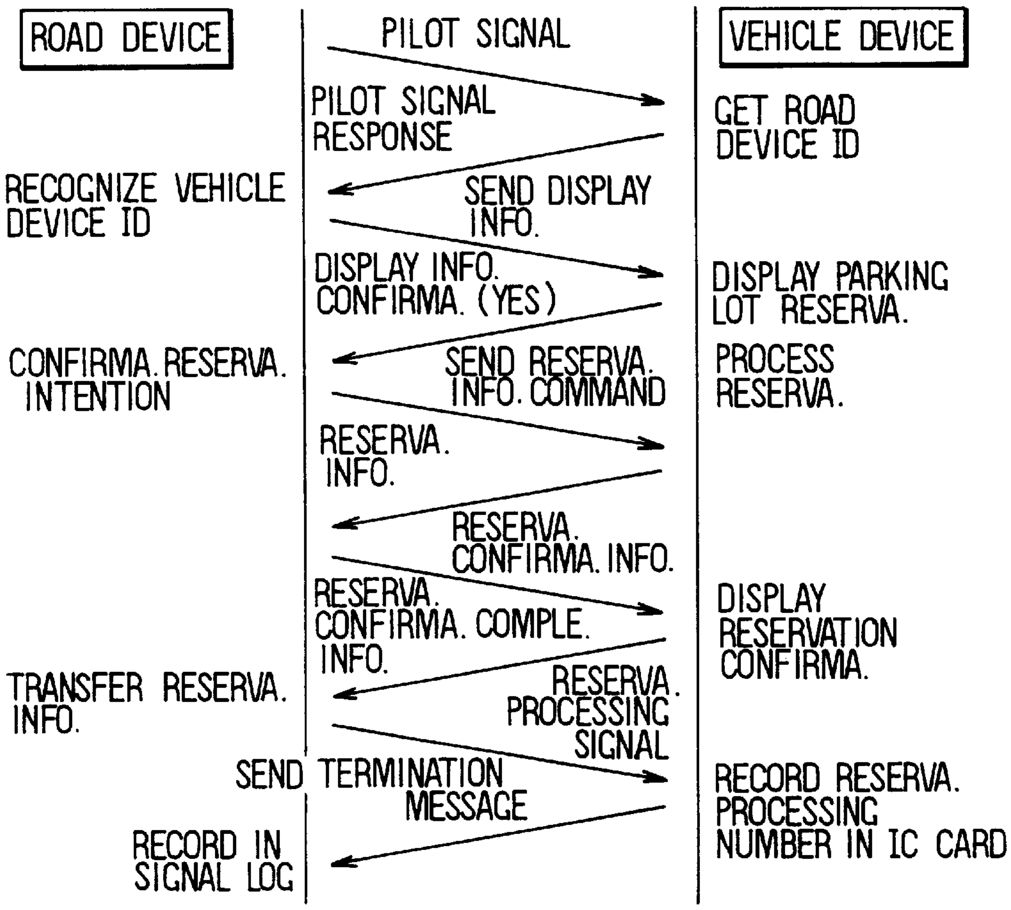
FIGS. 5A and 5B show communication flow of an overhead road device and a vehicle-mounted device in a case where parking-site reservation is performed in the embodiment.
Figure 5B:
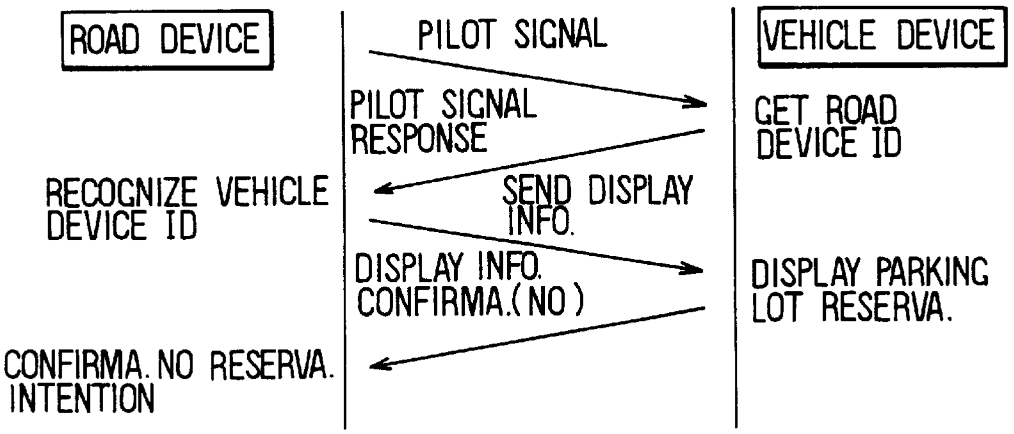

FIGS. 5A and 5B show an overview of flow of communication of the overhead road device 1 and the vehicle-mounted device 2 in a case of performing reservation of a parking site. FIG. 5A shows a case where the "Reserve" button **20*a* has been activated and a reservation intent exists, and FIG. 5B shows a case where the "Reserve" button 20*a*** has been deactivated and the reservation intent does not exist.

The overhead road device 1 periodically transmits a pilot signal for detecting whether a vehicle-mounted device 2 exists in the communication area. When the vehicle-mounted device 2 receives the pilot signal, the vehicle-mounted device 2 reads the overhead road-device ID from the pilot signal and transmits a pilot response signal to the overhead road device 1.

When the overhead road device 1 receives the pilot response signal from the vehicle-mounted device 2, the overhead road device 1 discriminates the ID of the vehicle-mounted device 2 and transmits display-use information. When the vehicle-mounted device 2 receives the display-use information, the vehicle-mounted device 2 transmits to the overhead road device 1 a display-use information receipt confirmation signal indicating that the display-use information has been received. Information on the presence or absence of reservation intent is included in the transmission at this time. Additionally, the vehicle-mounted device 2 performs parking-site reservation display indicating the state of usage of parking sites and the state of congestion of roads in accordance with the display-use information that has been received.

The overhead road device 1 confirms reservation intent included in the display-use information receipt confirmation signal, and in a case where reservation intent exists, transmits a reservation-information transmission instruction to the vehicle-mounted device 2. The vehicle-mounted device 2 receives the reservation-information transmission instruction and transmits reservation information.

The overhead road device 1 receives the reservation information and transmits reservation-confirmation information to allow the vehicle-mounted device 2 to verify whether the reservation information is correct. The vehicle-mounted device 2 displays the reservation-confirmation information, allowing the vehicle rider to perform confirmation. When confirmation of the reservation-confirmation information has been completed, reservation confirmation-completed information is transmitted to the overhead road device 1.

When the overhead road device 1 receives the reservation confirmation-completed information, the overhead road device 1 petitions the integrated control computer 7 for a reservation, and in a case where a reservation is available, receives a reservation processing number from the integrated control computer 7 and transmits the reservation processing number to the vehicle-mounted device 2. The vehicle-mounted device 2 records the reservation processing number received from the overhead road device 1 on the IC card 21, and transmits a termination message to notify the overhead road device 1 that the reservation processing number was received.

The overhead road device 1 records information from the vehicle-mounted device 2 as a communication log.

When the overhead road device 1 confirms that there is no reservation intent from the vehicle-mounted device 2 at the time that the display-use information receipt confirmation signal has been received, the overhead road device 1 terminates communication with the vehicle-mounted device 2, as shown in FIG. 5B.

Specific control operation by the vehicle-mounted device 2 and the overhead road device 1 in the above-described parking-site reservation will be described hereinafter.

(Control operation of the vehicle-mounted device 2 in parking-site reservation)

Figure 6:
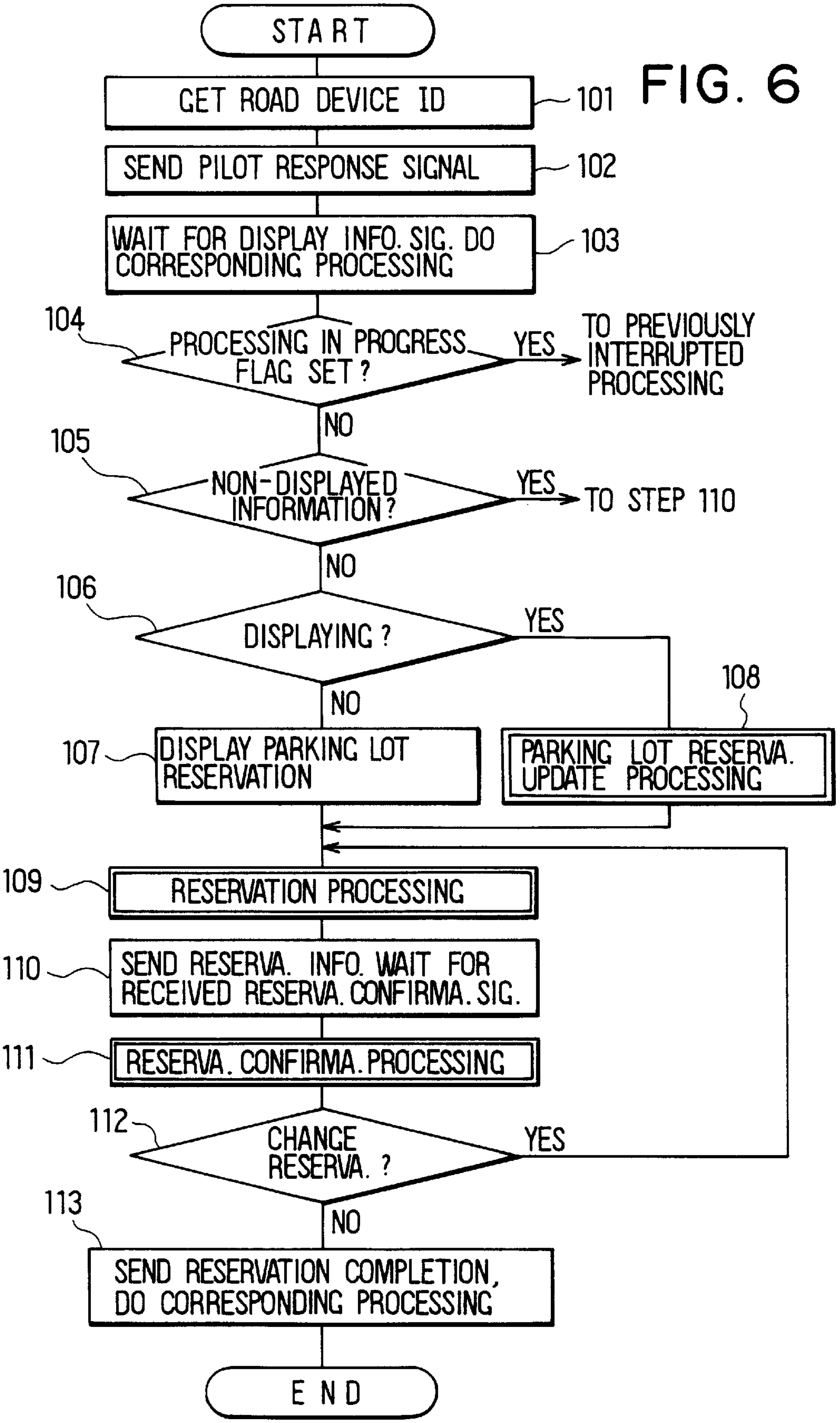
FIG. 6 is a flowchart showing a control operation of a vehicle-mounted device in parking-site reservation according to the embodiment.

The flowchart of FIG. 6 shows the control operation of this vehicle-mounted device 2.

The vehicle-mounted device 2 is in communication-standby state (hereinafter termed "sleep state") until a pilot signal is received from the overhead road device 1, and when the vehicle on which this vehicle-mounted device 2 is installed enters the communication area of the overhead road device 1, the vehicle-mounted device 2 receives the pilot signal and changes from the sleep state to an activated state.

Accordingly, the ID of the overhead road device which has sent the pilot signal is read (step 101), and a pilot response signal including the vehicle-mounted device ID as data is transmitted (step 102).

When the pilot response signal is transmitted, standby for receiving display-use information from the overhead road device 1 and processing corresponding thereto are executed (step 103).

Figure 7:
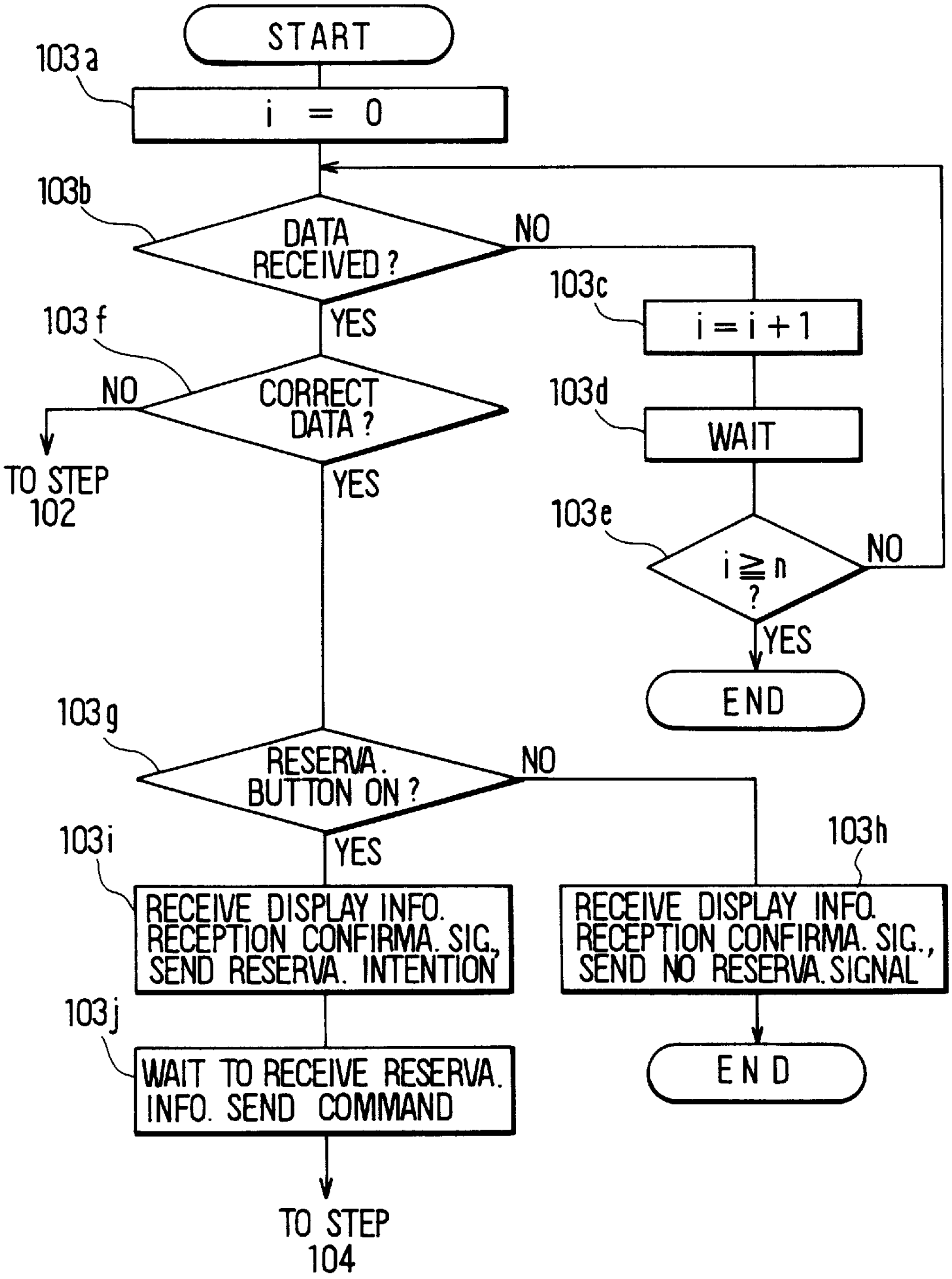
FIG. 7 is a flowchart showing a standby operation for receiving the display-use information in FIG. 6.

Specific processing thereof is shown in FIG. 7. Firstly, event-count data i is set to 0 (step 103*a*), it is determined whether data for display use has been received (step 103*b*), and in a case of no received data, the event-count data i is updated (step 103*c*), and thereafter time-wait processing is performed (step 103*d*) and it is determined whether the event-count data i has become a predetermined event count or more (step 103*e*). Until the event-count data i reaches a predetermined event count n, execution returns to step 103*b* and it is determined whether received data exists.

When a predetermined time elapses with received data remaining undetected, and the event-count data i reaches the predetermined event count n, the vehicle-mounted device 2 determines that a communication error has occurred and assumes the sleep state.

Additionally, when it is determined before the event-count data i reaches the predetermined event count n that received data has been obtained, it is determined whether this is correct data (step 103*f*), and when it is not correct data, execution returns to step 102 and is redone from transmission of the pilot signal. However, when the received data is correct, subsequently it is determined whether the "Reserve" button 20*a* has been actuated (step 103*g*).

In a case where the "Reserve" button 20*a* has not been actuated, a display-information receipt confirmation signal including no reservation intent is transmitted to the overhead road device 1 (step 103*h*), and the sleep state is effected.

In a case where the "Reserve" button 20*a* not been actuated, a display-information receipt confirmation signal including reservation intent is transmitted to the overhead road device 1 (step 103*i*), and receive-standby processing for a reservation-information transmission instruction from the overhead road device 1 is performed (step 103*j*).

This receive-standby processing for the reservation-information transmission instruction is processing performed as to whether the correct reservation-information transmission instruction was received within a predetermined time (i.e., time in which the event-count data i reaches n), as was described above. The sleep state is effected in a case where the reservation-information transmission instruction was not received within the predetermined time, and processing to retransmit the display-information receipt confirmation signal including reservation intent is performed in a case where the correct reservation-information transmission instruction was not received. In a case where the correct reservation-information transmission instruction was received, execution advances to step 104 in FIG. 6.

In step 104 it is determined whether the processing-in-progress flag has been set, and in the subsequent step 105 it is determined whether there exists emptied reservation information. Processing for these steps will be described later.

In a case where the determinations of steps 104 and 105 are both negative, it is determined whether display of a parking-site reservation is in progress (step 106). When display of a parking-site reservation is not being performed, display data is created based on display information transmitted from the overhead road device 1, and the display apparatus 20 is caused to perform the parking-site reservation display shown in FIG. 3.

Figure 8:
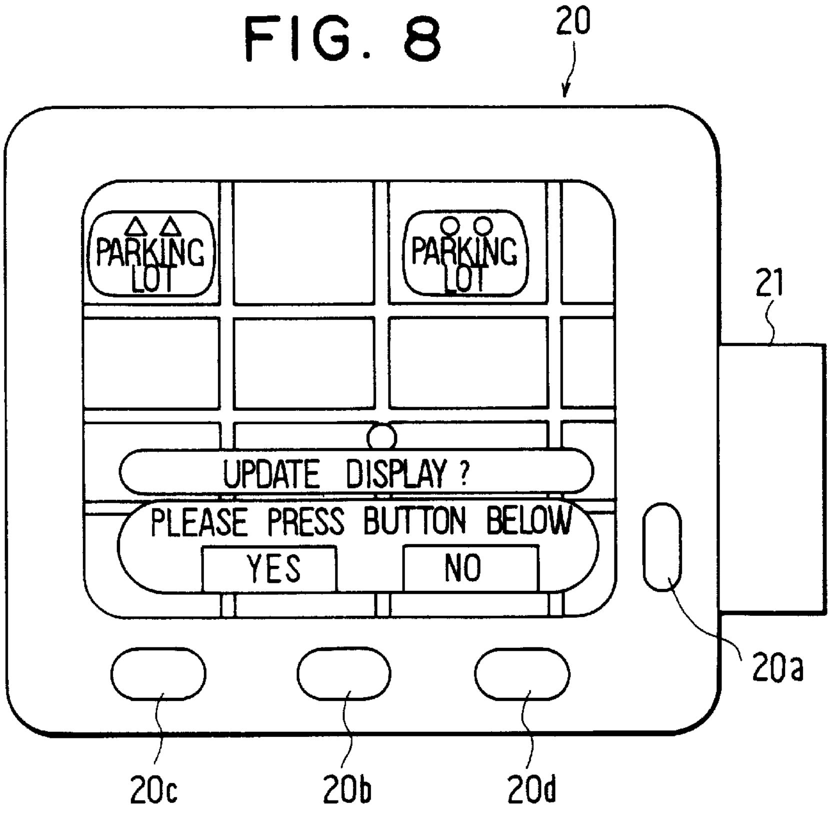
FIG. 8 shows a display for confirming whether display of parking-site reservation is to be updated in the embodiment.

When display of a parking-site reservation is in progress, processing as to whether the display is updated is performed (step 108). In this case, the confirmation dialog for updating the display shown in FIG. 8 is displayed, and when the "Yes" button is pressed, the parking-site display is updated with the display information that has been received; when the "No" button is pressed, the parking-site reservation display is caused to be continued without change.

Figure 9:
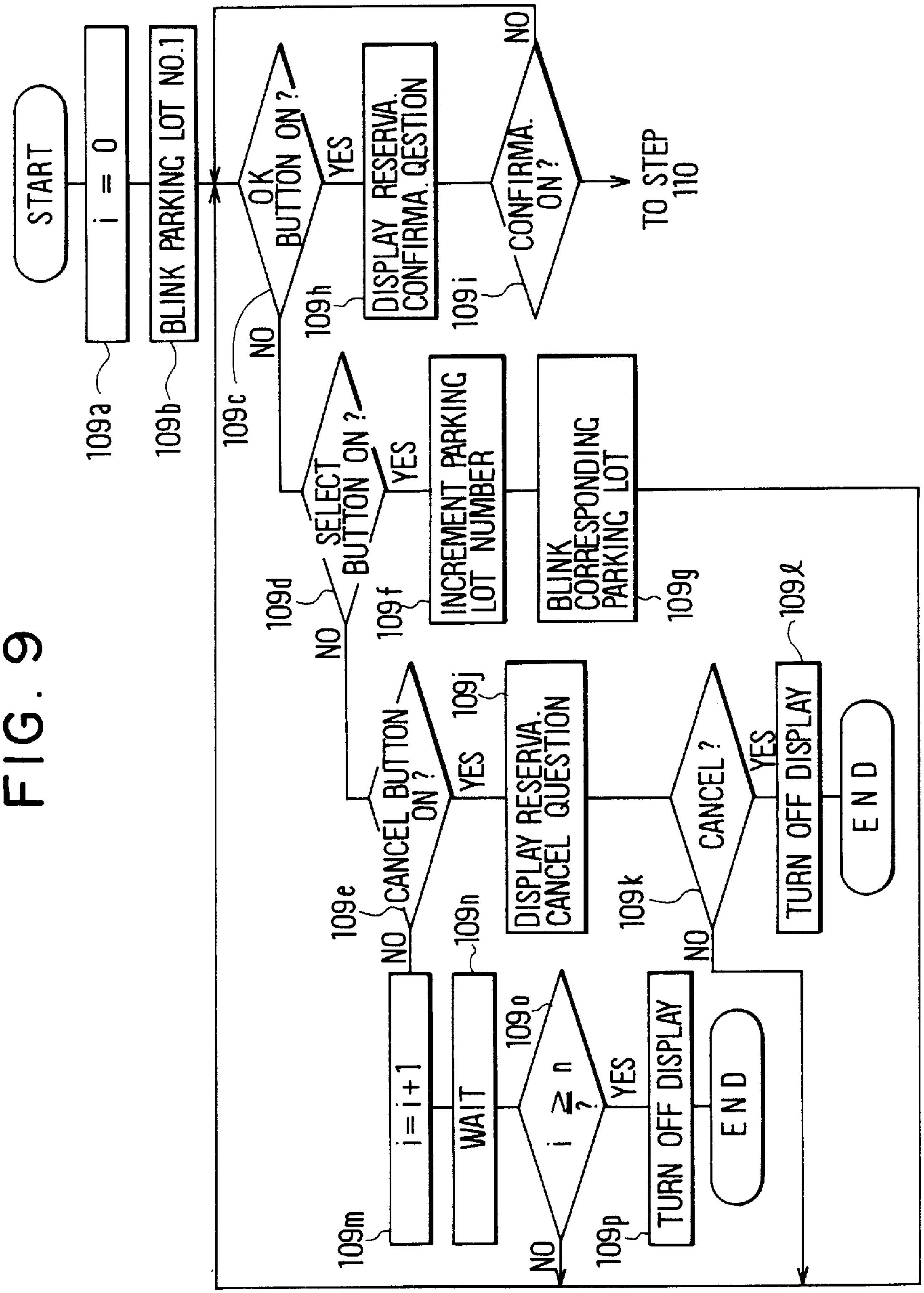
FIG. 9 is a flowchart showing specific processing of the reservation processing in FIG. 6.

Thereafter, reservation processing is performed (step 109). Specific processing thereof is shown in FIG. 9. First, the event-count data i is set to 0 (step 109*a*), and the display of parking site No. 1 on the display device is caused to flash (step 109*b*). Accordingly, it is determined whether the "OK" button 20*b* has been operated (step 109*c*). When the "OK" button 20*b* has not been operated, it is determined whether the "Select" button 20*c* or the "Cancel" button 20*d* has been operated (steps 109*d* and 109*e*). Each time the "Select" button 20*c* is operated, the parking-site number is incremented (step 109*f*) and the corresponding display of the parking-site number is caused to flash (step 109*g*).

Figure 10:
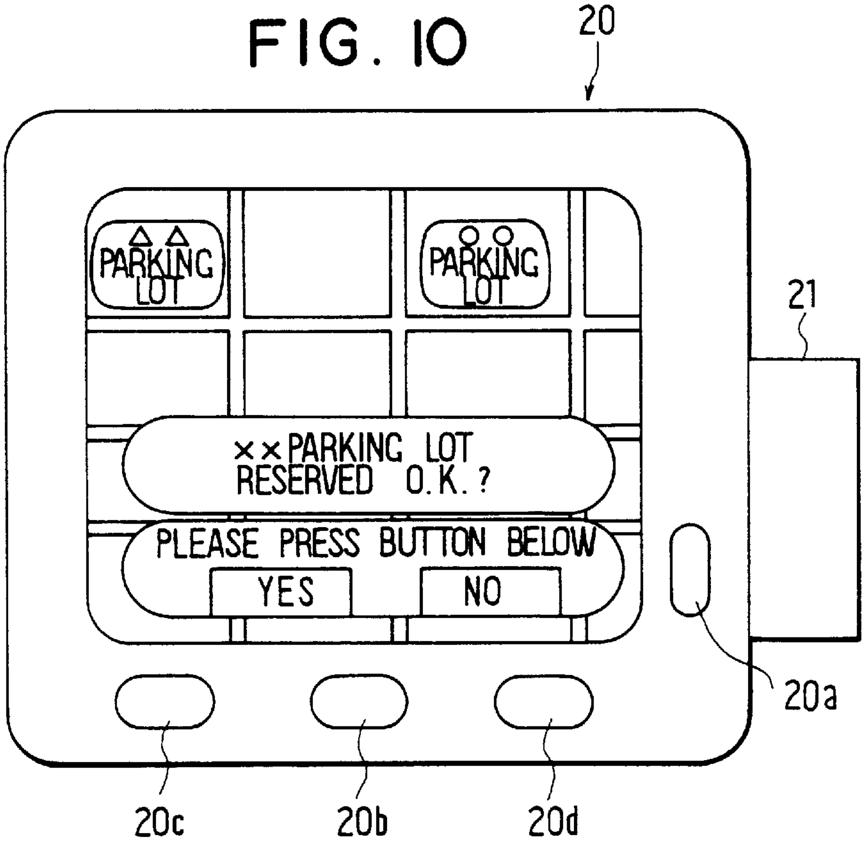
FIG. 10 shows a reservation-confirmation prompt display in reservation processing in the embodiment.

When the "OK" button 20*b* is operated while the display of the desired parking-site number is flashing, a reservation-confirmation prompt is displayed (step 109*h*). A display example of this reservation-confirmation prompt display is shown in FIG. 10. Herein, execution returns from step 109*i* to step 109*c* and reservation selection is again performed when the "No" button is pressed, and execution advances to step 110 in FIG. 6 when the "Yes" button is pressed.

Figure 11:
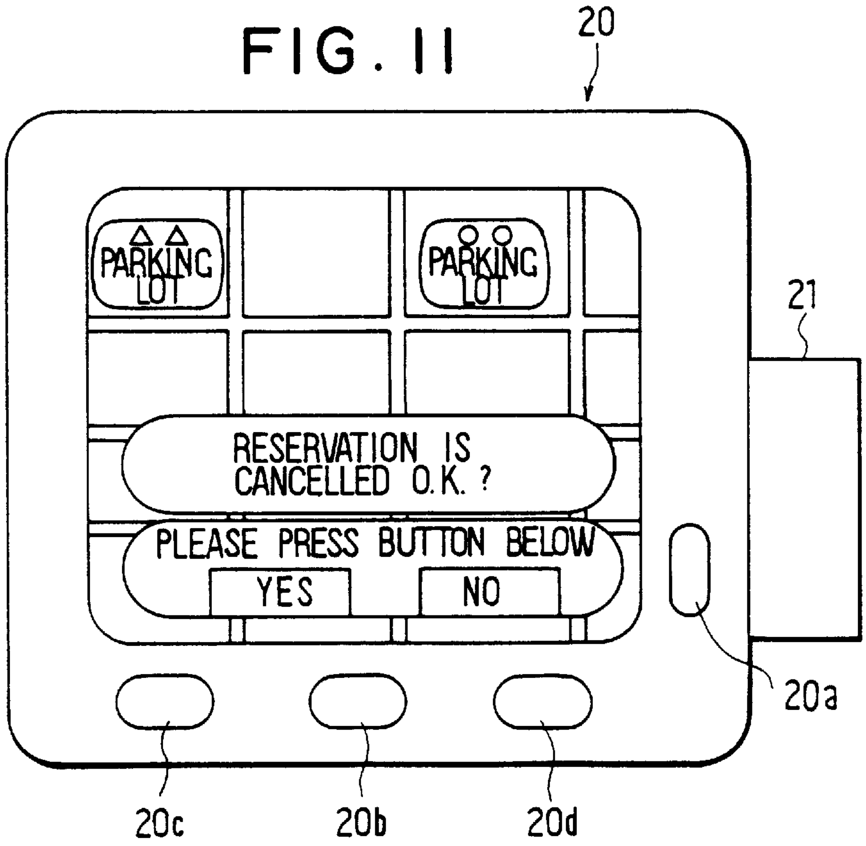
FIG. 11 shows a reservation-cancellation display in reservation processing in the embodiment.

When the "Cancel" button 20*d* is operated in order to cancel a parking-site reservation, reservation-cancellation display is performed (step 109*j*). A display example of this reservation-cancellation display is shown in FIG. 11. In this case, execution returns from step 109*k* to step 109*c* and reservation selection is again performed when the "No" button is pressed, the screen is erased (step 109*a*) and the sleep state is effected when the "Yes" button is pressed.

When neither button is operated, processing from step 109*m* through step 109*o* is repeated, and when it is determined that the event-count data i incremented in step 109*m* has reached n (step 109*o*), the screen is erased (step 109*p*) and the sleep state is effected.

Figure 12:
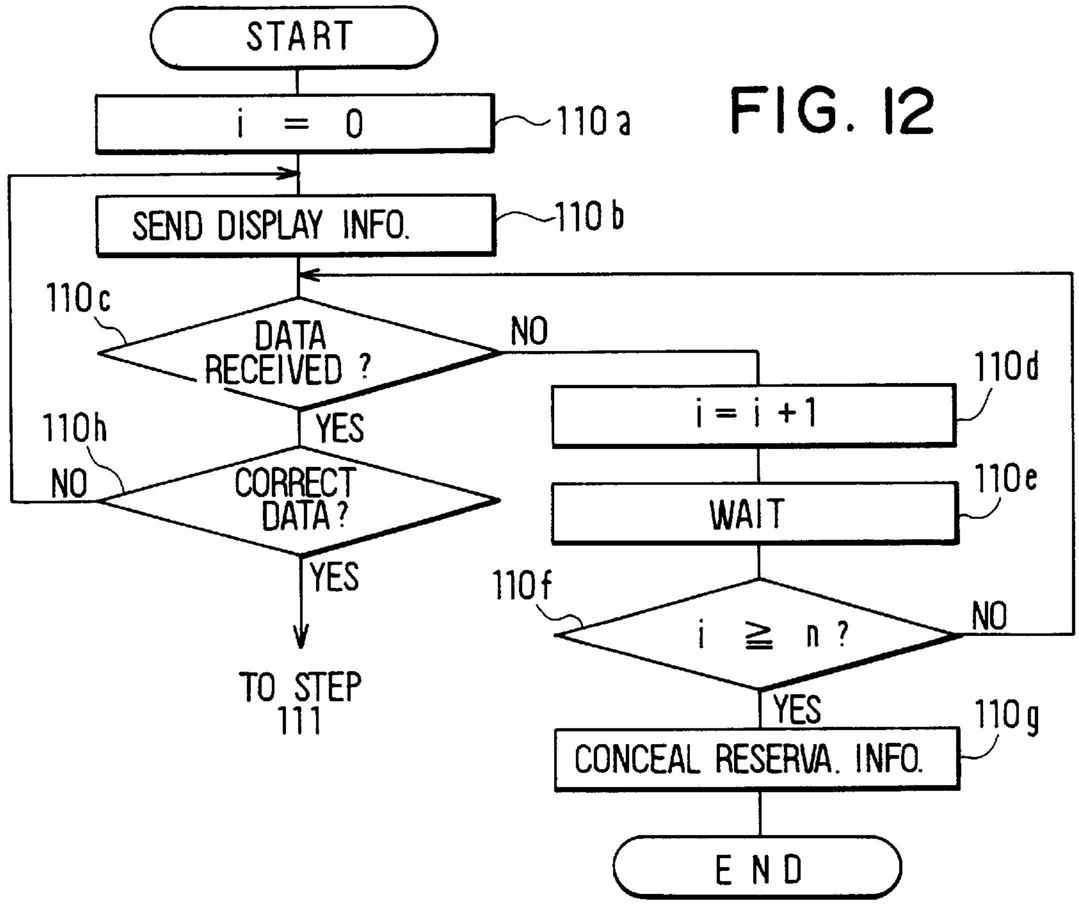
FIG. 12 is a flowchart showing processing for transmitting the reservation information of FIG. 6 and for awaiting receipt of reservation-confirmation information in the embodiment.

Accordingly, when an operation for establishing a parking-site reservation has been performed, the transmission of reservation information and the receive-standby processing for reservation-confirmation information in step 110 of FIG. 6 are performed. Specific processing thereof is shown in FIG. 12. Firstly, the event-count data i is set to 0 (step 110*a*), and reservation information indicating the parking site for which a reservation has been established is transmitted to the overhead road device 1 (step 110*b*). Thereafter, it is determined whether received data for reservation-confirmation information exists (step 110*c*). In a case where no received data exists, processing to determine whether received data is present is repeated via steps 110*d* through 110*f*.

When received data exists, it is determined whether this is correct data (step 110*h*). When not correct data, transmission of the reservation information is again performed. In a case where correct received data has been obtained, execution advances to step 111 in FIG. 6.

When the event-count data i reaches n without data having been received, the reservation information is cleared (step 110*g*) and the sleep mode is effected. In this case, a pilot signal is obtained from the subsequent overhead road device 1, and because there exists reservation information cleared when step 105 was reached from step 101 in FIG. 6, execution advances to step 110 and the above-described processing is again performed. By doing this, transmission of a reservation to a subsequent overhead road device 1 can be restarted even in a case where communication with an overhead road device 1 does not proceed smoothly after establishment of a reservation has been performed.

Figure 13:
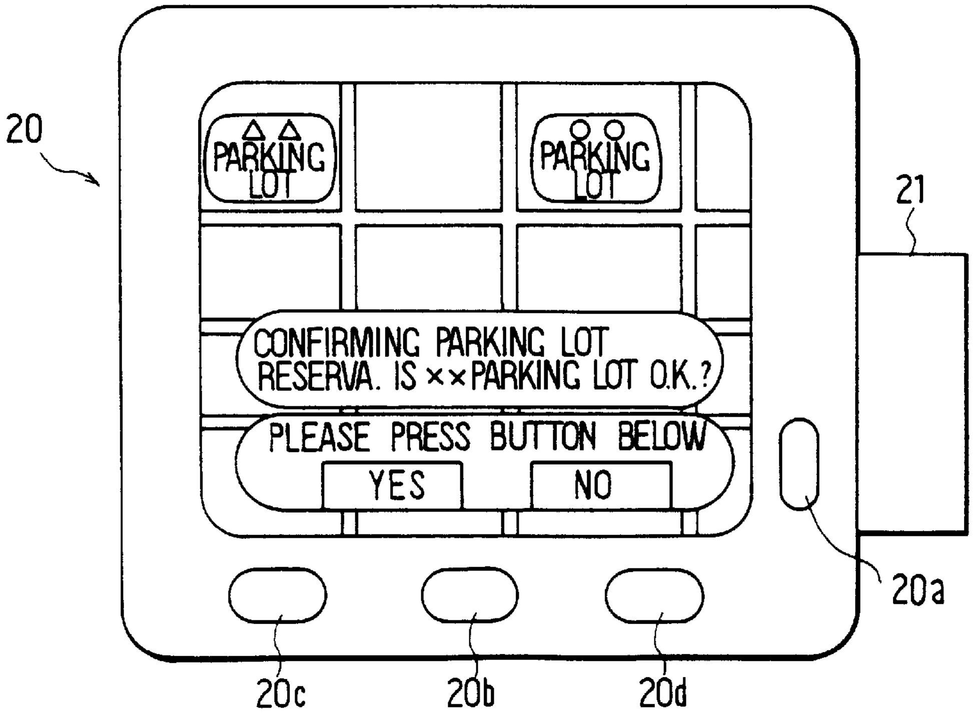
FIG. 13 shows a reservation-confirmation display in the reservation-confirmation processing of FIG. 6.

When the reservation-confirmation information has been correctly received, reservation-confirmation processing is performed (step 111). In this case, the display apparatus 20 is caused to display the reservation confirmation shown in FIG. 13. Herein, when the "No" button is pressed in a case where an error exists in the reservation information or in a case where the rider wishes to alter the reservation, execution is returned from step 112 to step 109 and reservation processing is again performed; when the "Yes" button is pressed, execution advances to step 113.

Figure 14:
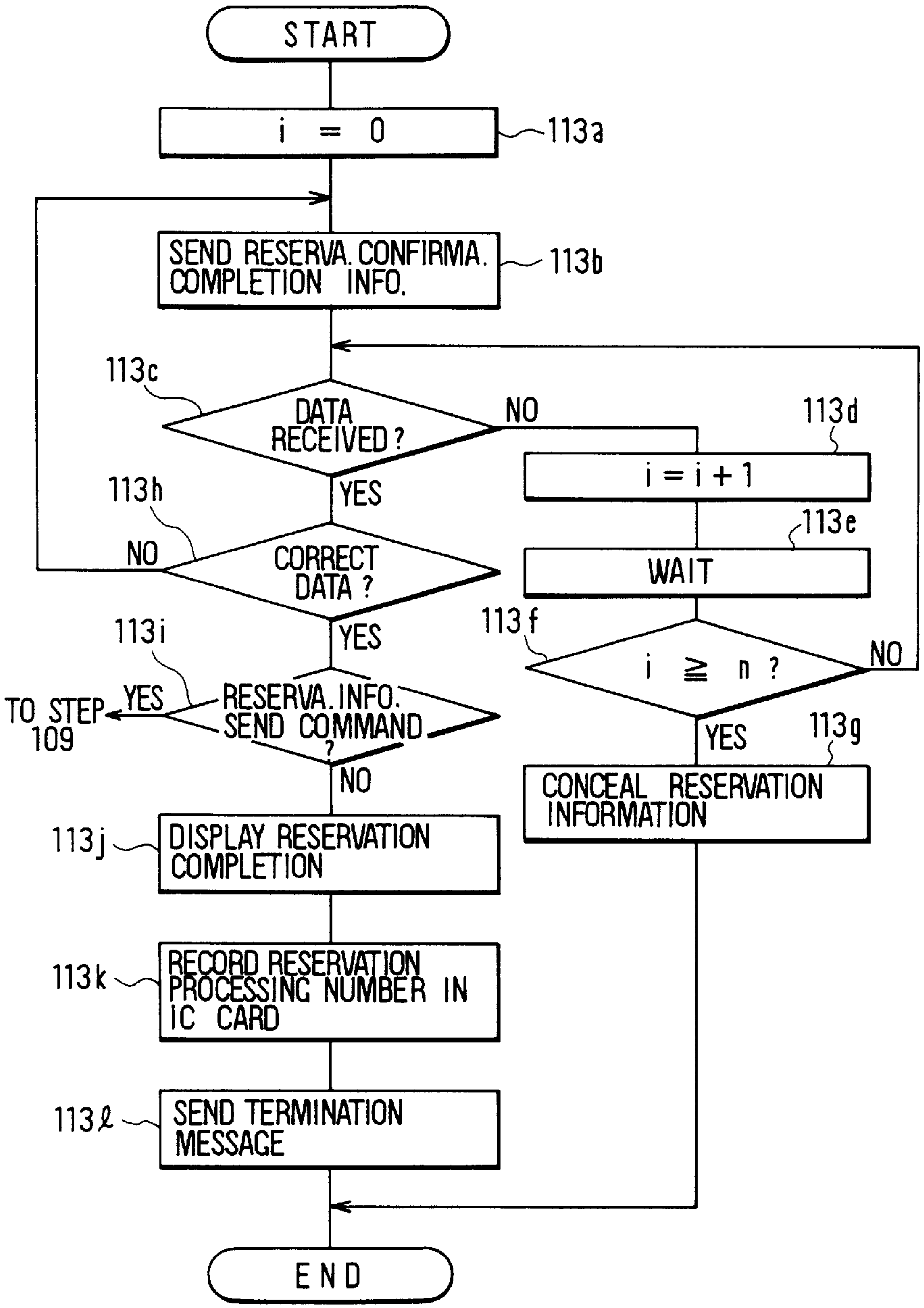
FIG. 14 is a flowchart showing transmission of the reservation-confirmation completion of FIG. 6, and corresponding processing therefor.

At this step 113, the reservation-confirmation completion message is transmitted and corresponding processing therefor is executed. Specific processing thereof is shown in FIG. 14. Firstly, the event-count data i is set to 0 (step 113*a*), and reservation confirmation-completed information is transmitted to the overhead road device 1 (step 113*a*). Thereafter, it is determined whether received data for the reservation processing number exists (step 113*a*). In a case where no received data exists, processing to determine whether received data is present is repeated via steps 113*d* through 113*f*.

When received data exists, it is determined whether this is correct data (step 113*h*). When it is not correct data, transmission of the reservation confirmation-completed information is again performed. When the event-count data i reaches n without data having been received, the reservation information is cleared (step 113*g*) and the sleep mode is effected. In this case, transmission to a subsequent overhead road device 1 is restarted due to the cleared reservation information, as was described above.

In a case where correct received data has been obtained, it is determined whether this received data is a reservation-information transmission instruction (step 113*i*). As will be described later, the overhead road device 1 petitions the integrated control computer 7 for a reservation, and in a case of no availability at the parking site, in order to retransmit a reservation-information transmission instruction, it is determined whether the reservation-information transmission instruction has been issued.

Figure 15:
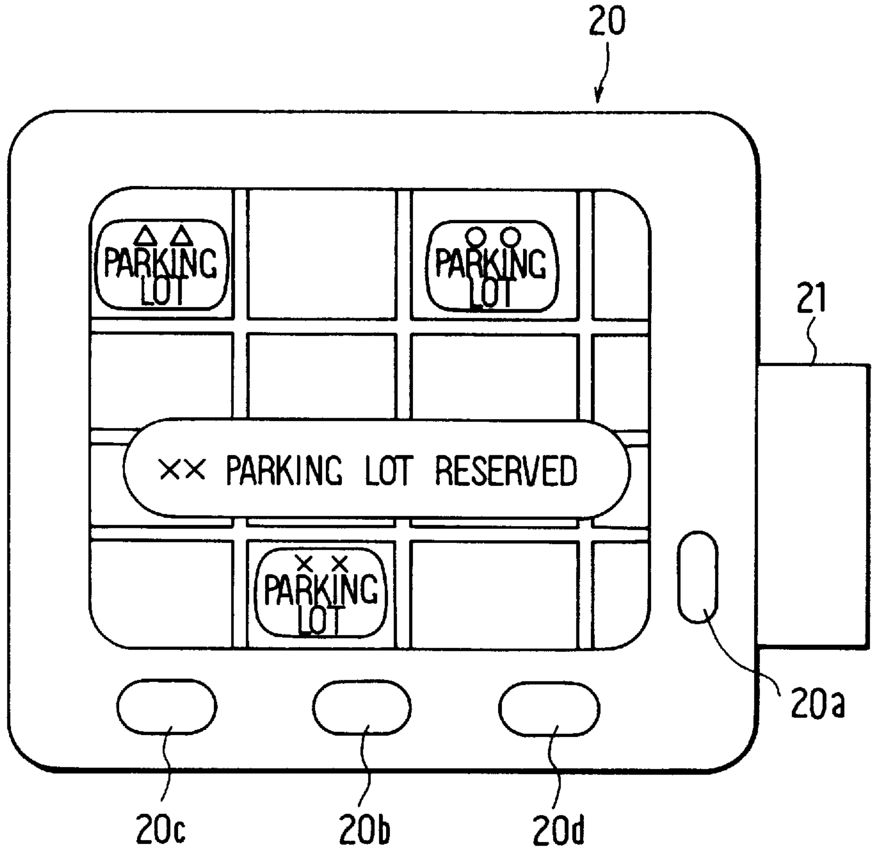
FIG. 15 shows a completion display in a case where reservation has been completed in the embodiment.

When the received data is a reservation-information transmission instruction, execution returns to step 109 and reservation processing is again performed, but when the received data is not a reservation-information transmission instruction, reservation-completed display is performed (step 113*j*). A display example of this reservation-completed display is shown in FIG. 15. Accordingly, the reservation processing number is recorded on the IC card 21 (step 113*k*), a termination message is transmitted to the overhead road device 1 (step 113*l*), and the sleep state is effected.

Figure 16:
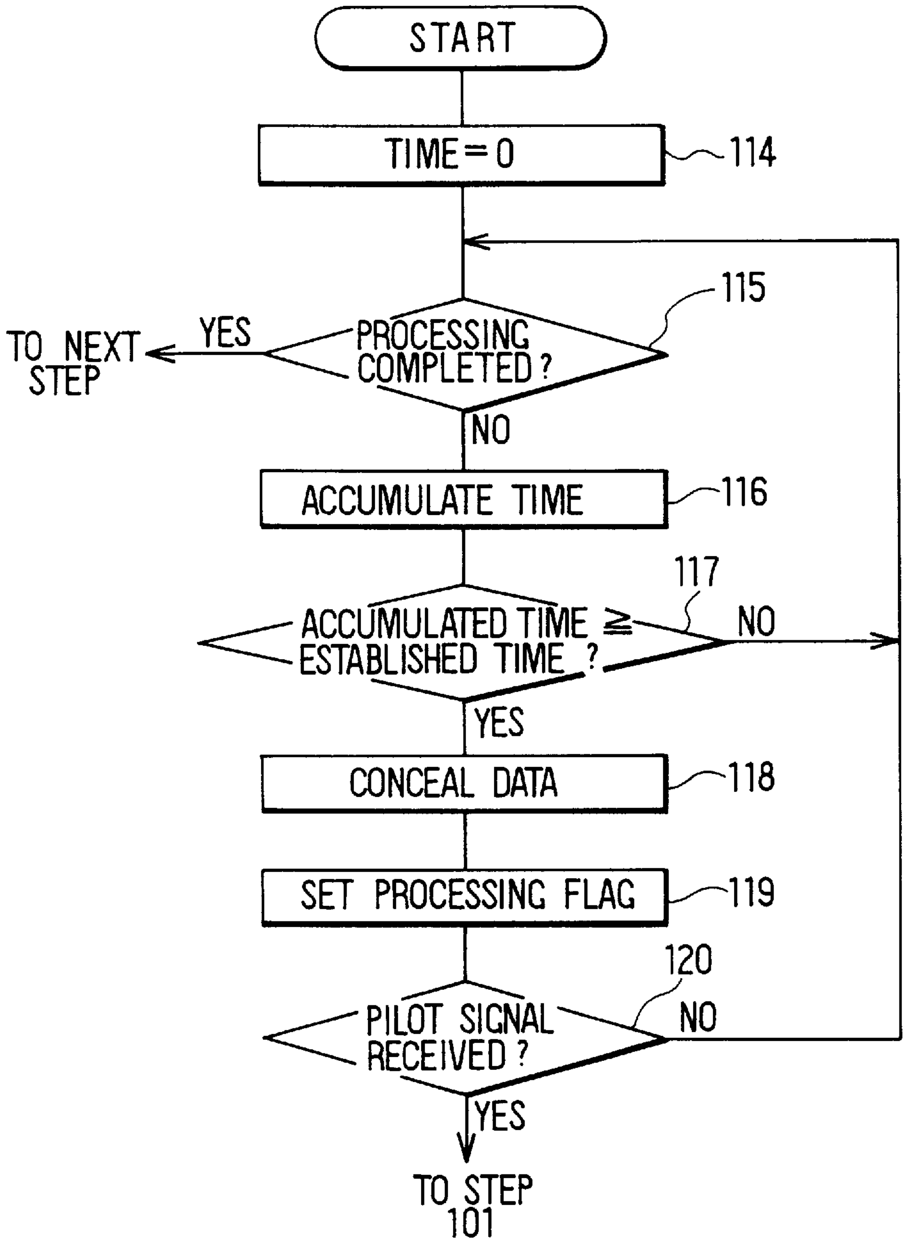
FIG. 16 is a flowchart showing processing performed to cause communication processing to be continued when communication processing for a reservation is not completed within a predetermined time interval in the embodiment.

Operation by the rider employing a display screen is required in the processing of the above-described steps 108, 109, and 111, and so there may be a case when processing thereof is not completed during the time of communication with one overhead road device 1. Accordingly, the processing shown in FIG. 16 is executed with respect to the various processing for these situations.

First, time is set to 0 (step 114), and it is determined whether processing has been completed (step 115). In a case where processing has been completed, execution advances to the next processing step, but during the interval until processing is completed, time is accumulated (step 116), and it is determined whether the accumulated time has become the established time (step 117). In this case, the established time is established in correspondence with the time in which communication with one overhead road device 1 can be performed. The above-described processing is repeated until the accumulated time reaches the established time. Accordingly, when the accumulated time reaches the established time without processing being completed, the data related to that processing is cleared (step 118) and the processing-in-progress flag is set (step 119). Accordingly, it is determined whether a pilot signal has been transmitted from a subsequent overhead road device 1 (step 120), and the foregoing processing is repeated until a pilot signal is transmitted.

At this time, when a pilot signal is transmitted from a subsequent overhead road device 1, processing is started from step 101, and because the processing-in-progress flag is set when step 104 is reached, determination therefor becomes affirmative, and execution is restarted from the processing previously interrupted without completion.

By performing such operations, reservation of a parking site can be completed by communication with a subsequent overhead road device 1 even in a case where communication processing for parking-site reservation with one overhead road device 1 is not completed.

(Control operation of the overhead road device 1 in parking-site reservation)

Figure 17:
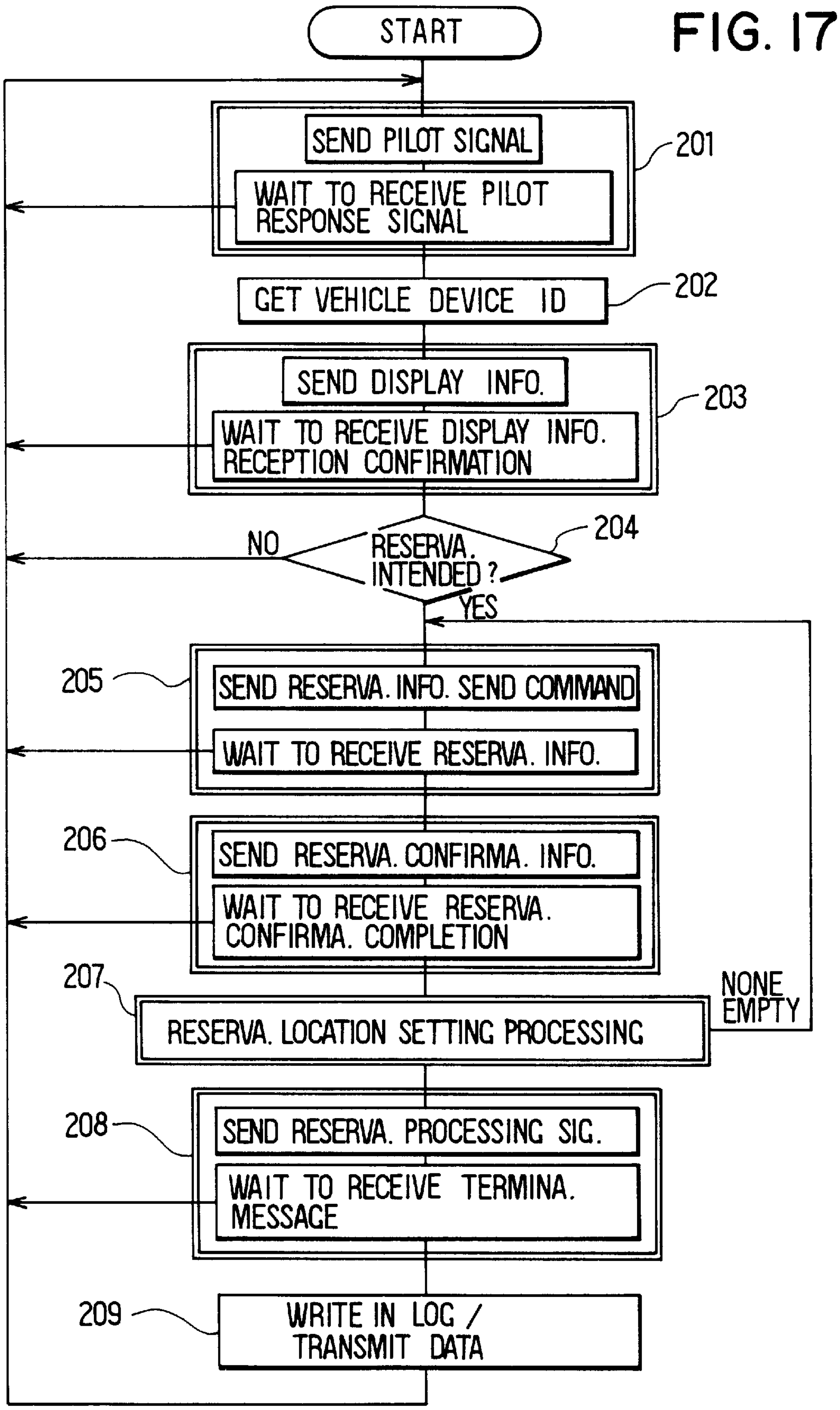
FIG. 17 is a flowchart showing a control operation of an overhead road device during parking-site reservation in the embodiment.

The flowchart of FIG. 17 shows a control operation with the overhead road device 1.

The overhead road device 1 periodically transmits a pilot signal and checks whether a pilot response signal has been received (step 201). When a pilot response signal is received, the vehicle-mounted device ID is read from the pilot response signal (step 202).

Next, the overhead road device 1 transmits display-use information to the vehicle-mounted device 2, and after transmission, awaits receipt of a display-use receipt confirmation signal (step 203).

When a display-use information receipt confirmation signal is received, the data is checked for the presence of reservation intent included therein (step 204). In a case where reservation intent does not exist, execution returns to the step for transmitting the pilot signal. In a case where reservation intent exists, a reservation-information transmission instruction is transmitted to the vehicle-mounted device 2, and receipt of reservation information from the vehicle-mounted device 2 is awaited (step 205).

When reservation information is received, reservation-confirmation information for confirming the reservation information is transmitted to the vehicle-mounted device 2, and receipt of reservation confirmation-completed information from the vehicle-mounted device 2 is awaited (step 206).

Figure 18:
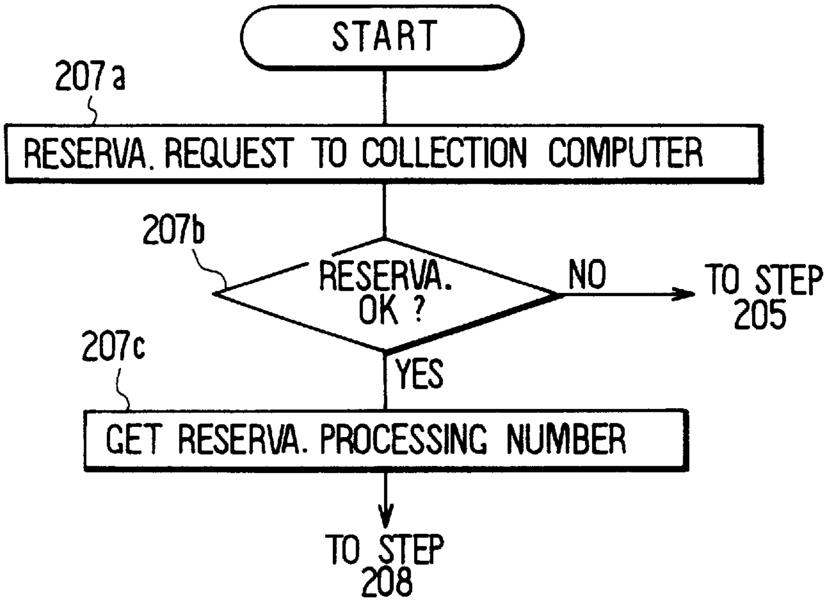
FIG. 18 is a flowchart showing the reserved-location finalization processing in FIG. 17.

When reservation confirmation-completed information is received, reserved-location finalization processing is performed (step 207). Specific processing thereof is shown in FIG. 18. The overhead road device 1 performs communication with the integrated control computer 7 and petitions for a reservation (step 207*a*), and it is determined whether a reservation is acceptable (step 207*b*). In a case where the reservation is acceptable, a reservation processing number is accepted from the integrated control computer 7 (step 207*c*). However, in a case where there is no availability at the parking site where the reservation is desired, and no reservation can be made, execution returns to step 205, and a reservation-information transmission instruction is transmitted to the vehicle-mounted device 2. In this case, reservation processing is again executed at the vehicle-mounted device 2.

When a reservation processing number is accepted from the integrated control computer 7, the reservation processing number is transmitted to the vehicle-mounted device 2 and receipt of a termination message from the vehicle-mounted device 2 is awaited (step 208).

When a termination message is received, communication information from the vehicle-mounted device 2 is recorded in a communication log, and is forwarded to the integrated control computer 7 (step 209).

The integrated control computer 7 receives this forwarded data and forwards the reservation processing number to the parking-site control computer 6, and the parking-site control computer 6 forwards the reservation processing number to a parking-site entrance overhead road device 4 and a parking-site exit overhead road device 5.

To prevent the same vehicle from making reservations at more than one parking site, once the integrated control computer 7 receives the termination message from the vehicle-mounted device 2, it may as a policy reject any subsequent reservation attempts from the same vehicle. Alternatively, to permit the vehicle to reserve a sequence of parking sites for a single trip or several trips, the integrated control computer 7 may accept a second or later reservation only when, for example, the travel time between it and any previously reserved parking site is a minimum time period sufficient for vehicle travel between the two sites.

In a case where a signal from the vehicle-mounted device 2 cannot be received even when awaited for a fixed time in the receive-standby processing of steps 201, 203, 205, 206, and 208, execution is returned to the pilot-signal transmission mode of step 201 and retransmission of the pilot signal is performed.

A mode of operation at the parking site will be described next.

Figure 19:
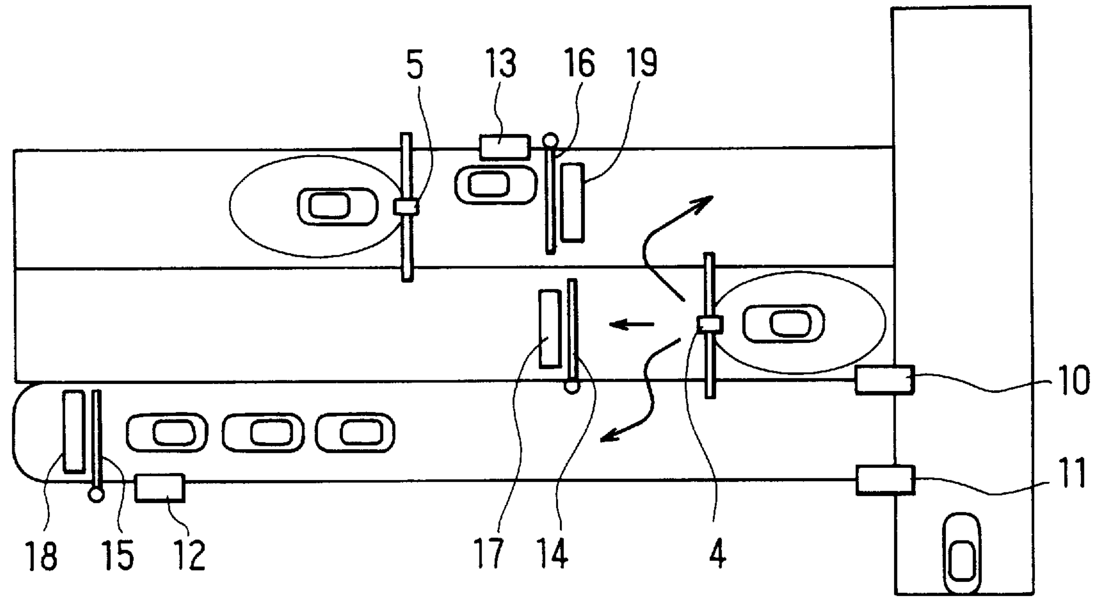
FIG. 19 shows a structure of a parking site in the embodiment.

FIG. 19 shows the structure of a parking site. An entrance sign for reserved-vehicle use 10 to indicate an entrance for use by a reserved vehicle and an entrance sign for nonreserved-vehicle use 11 to indicate an entrance for use by a nonreserved vehicle are disposed at an entrance of the parking site. As in the prior art, a nonreserved vehicle accepts a parking ticket from a ticket-issuing device 12 and performs payment of a fee at a fee-payment device 13 disposed at an exit of the parking site.

The parking-site entrance overhead road device 4 performs reservation confirmation by communication with the vehicle-mounted device 2, and opens a barrier device (i.e., a gate) 14 for a vehicle having a confirmed reservation, permitting entry to the parking site. In a case where a nonreserved vehicle has passed the parking-site entrance overhead road device 4, no reservation is confirmed, and so the barrier device 14 remains closed. In this case, the vehicle either advances toward the parking site's ticket-issuing device 12 or executes a U-turn toward the exit. Additionally, when a vehicle having a reservation vacates the parking site, fee settlement is performed through communication with the parking-site exit overhead road device 5.

Barrier devices 14 through 16 are provided at the entrance and exit areas of the parking sites, and vehicle sensors 17 through 19 for detecting passing vehicles are installed at respective vehicle-passage locations. Information on a passing vehicle detected by vehicle sensors 17, 18, or 19 is input to the parking-site control computer 6, and the parking-site control computer 6 ascertains a state of usage of the parking site based on this input information.

Furthermore, the parking-site control computer 6 controls the number of tickets issued by the ticket-issuing device 12 to ensure an available parking site for a vehicle which has placed a reservation.

Figure 20:
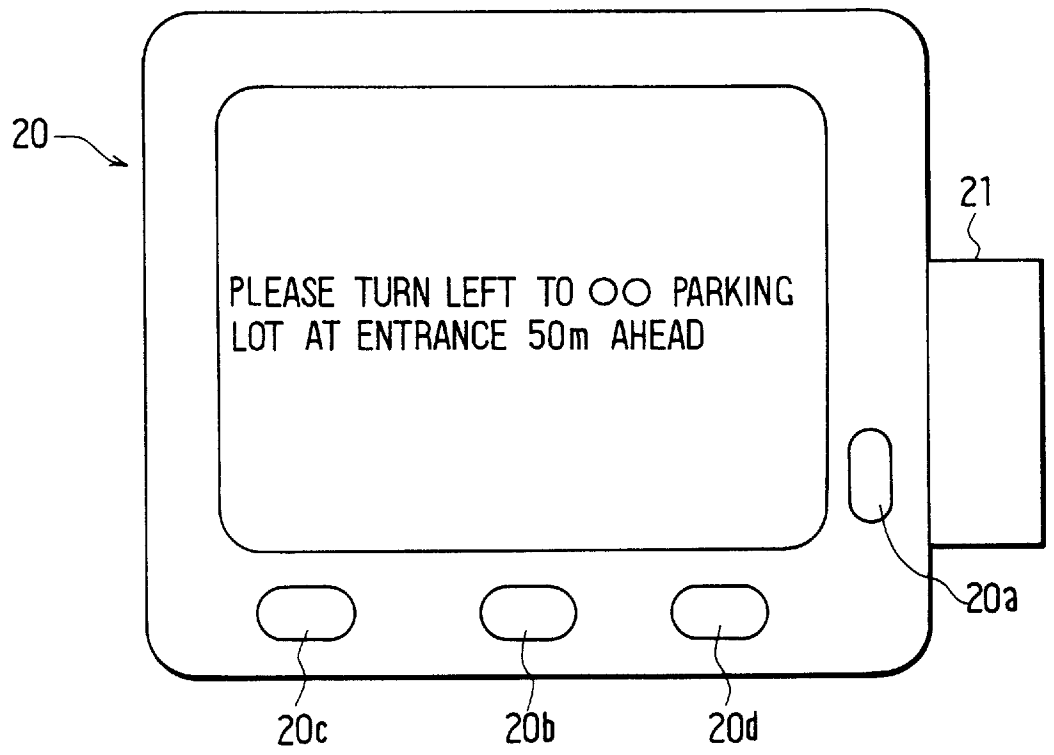
FIG. 20 shows a parking-site advisory display shown at a parking-site advisory location in the embodiment.

A parking-site advisory overhead road device 3 is disposed at a parking-site advisory location prior to arriving at the parking-site entrance, and the vehicle-mounted device 2 performs the parking-site advisory display shown in FIG. 20 through communication between this parking-site advisory overhead road device 3 and the vehicle-mounted device 2.

Figure 21A:
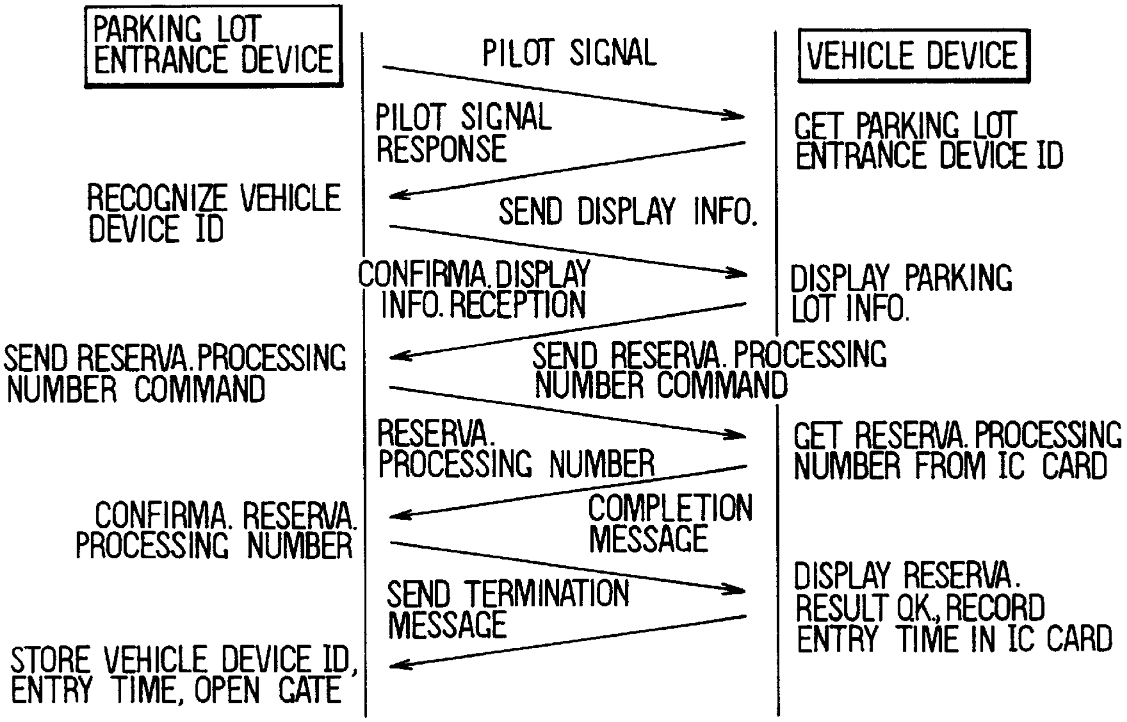
FIGS. 21A and 21B show communication flow of a parking-site entrance overhead road device at a parking-site entrance in the embodiment.
Figure 21B:
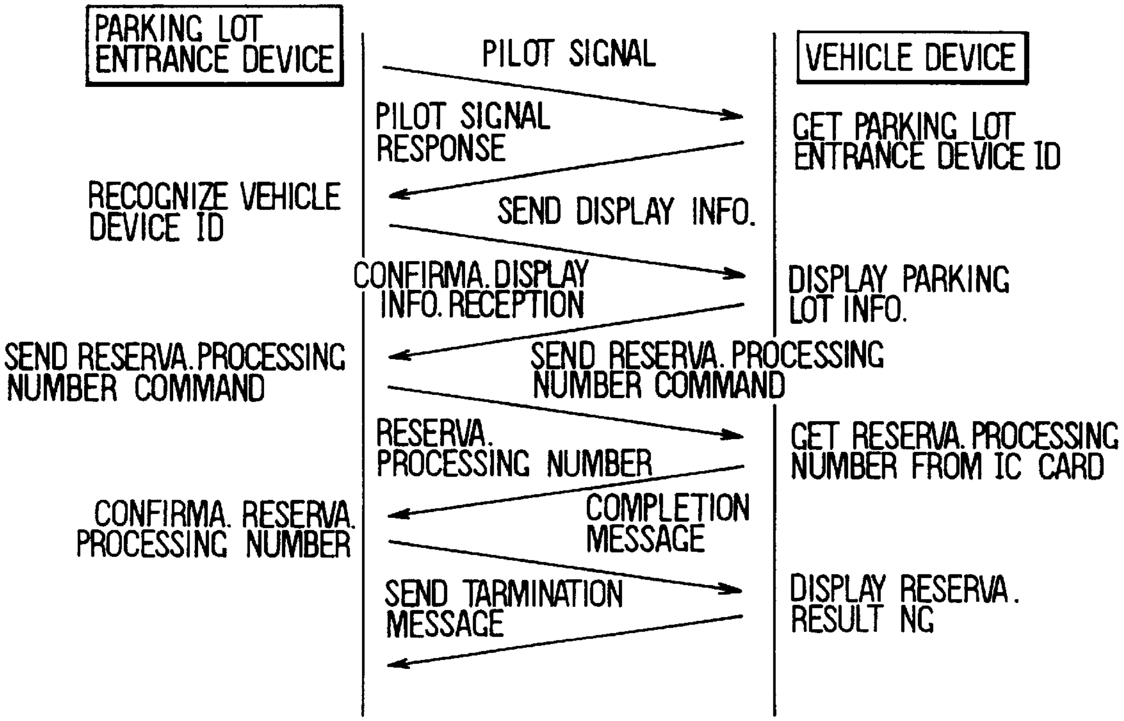

FIGS. 21A and 21B show an overview of flow of communication of the parking-site entrance overhead road device 4 and the vehicle-mounted device 2 in a case of performing reservation of a parking site. FIG. 21A shows a case of performing communication with a vehicle which has been reserved, and FIG. 21B shows a case of performing communication with a vehicle which has not been reserved.

The parking-site entrance overhead road device 4 transmits a pilot signal. The vehicle-mounted device 2 reads the parking-site entrance overhead road-device ID from the pilot signal and transmits a pilot response signal to the parking-site entrance overhead road device 4.

When the parking-site entrance overhead road device 4 receives the pilot response signal from the vehicle-mounted device 2, the parking-site entrance overhead road device 4 discriminates the ID of the vehicle-mounted device 2 and transmits display-use information. Display-use information in this case is data for causing information relating to the parking site to be displayed. When the vehicle-mounted device 2 receives the display-use information, the vehicle-mounted device 2 conducts parking-site information display based on this data and performs transmission to the parking-site entrance overhead road device 4 to the effect that the display-use information was received.

When the parking-site entrance overhead road device 4 receives the display-use information receipt confirmation signal, the parking-site entrance overhead road device 4 transmits a reservation processing-number transmission instruction to the vehicle-mounted device 2. The vehicle-mounted device 2 receives the reservation processing-number transmission instruction and transmits a reservation processing number to the parking-site entrance overhead road device 4.

When the parking-site entrance overhead road device 4 receives the reservation processing number, the parking-site entrance overhead road device 4 performs confirmation thereof from the reservation processing number which was previously sent, and in a case where confirmation is successful, transmits to the vehicle-mounted device 2 a completion message including display information for the parking-site entry time and a successful reservation result. The vehicle-mounted device 2 performs display of the successful reservation result along with recording the parking-site entry time on the IC card 21 and transmitting a termination message to the parking-site entrance overhead road device 4.

When the parking-site entrance overhead road device 4 receives the termination message, the parking-site entrance overhead road device 4 records the vehicle-mounted device ID and the parking-site entry time, along with performing processing to cause the barrier device to be opened.

In a case where confirmation of the reservation processing number was not obtained, a completion message including an error message is transmitted to the vehicle-mounted device 2, as shown in FIG. 21 (*b*). The vehicle-mounted device 2 performs display for an unsuccessful reservation result and transmits a termination message to the parking-site entrance overhead road device 4.

Specific control operation by the vehicle-mounted device 2 and by the parking-site entrance overhead road device 4 at the above-described parking-site entrance will be described hereinafter.

(Control operation of the vehicle-mounted device 2 at the parking-site entrance)

Figure 22:
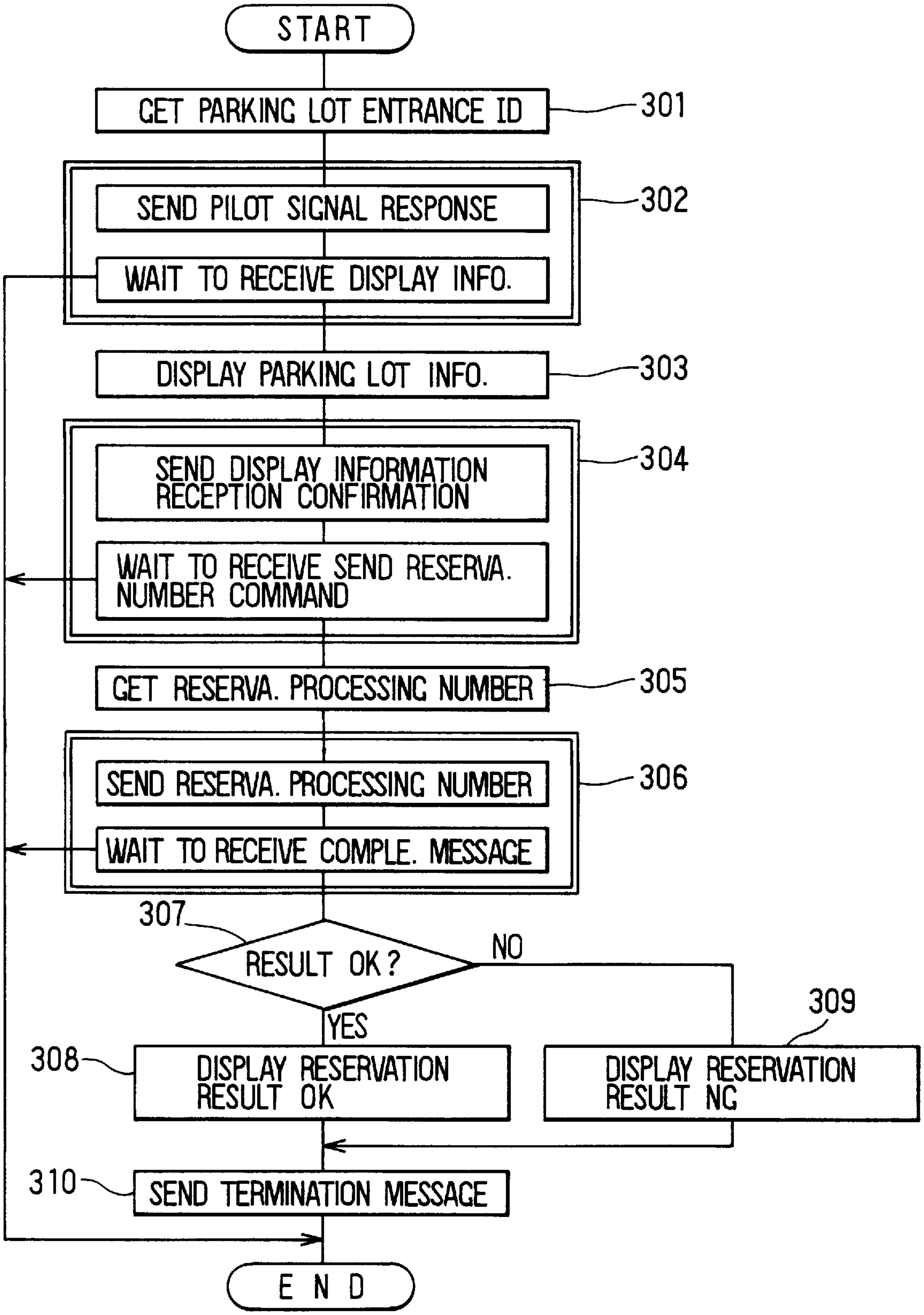
FIG. 22 is a flowchart showing control operation of a vehicle-mounted device at a parking-site entrance in the embodiment.

The flowchart of FIG. 22 shows control operation with this vehicle-mounted device 2.

When the vehicle-mounted device 2 receives a pilot signal from the parking-site entrance overhead road device 4, the vehicle-mounted device 2 enters an activated state and reads the parking-site entrance overhead road-device ID from the pilot signal (step 301). Accordingly, a pilot response signal including the vehicle-mounted device ID as data is transmitted to the parking-site entrance overhead road device 4, and receipt of display-use information from the parking-site entrance overhead road device 4 is awaited (step 302).

When display-use information is received, display of information relating to a parking site is performed based on this display-use information (step 303). Accordingly, a display-use information receipt-confirmation signal is transmitted to the parking-site entrance overhead road device 4, and a reservation processing-number transmission instruction from the parking-site entrance overhead road device 4 is awaited (step 304).

When a reservation processing-number transmission instruction is received, the reservation processing number recorded on the IC card is read (step 305), the reservation processing number is transmitted to the parking-site entrance overhead road device 4, and receipt of a completion message is awaited (step 306).

Figure 23:
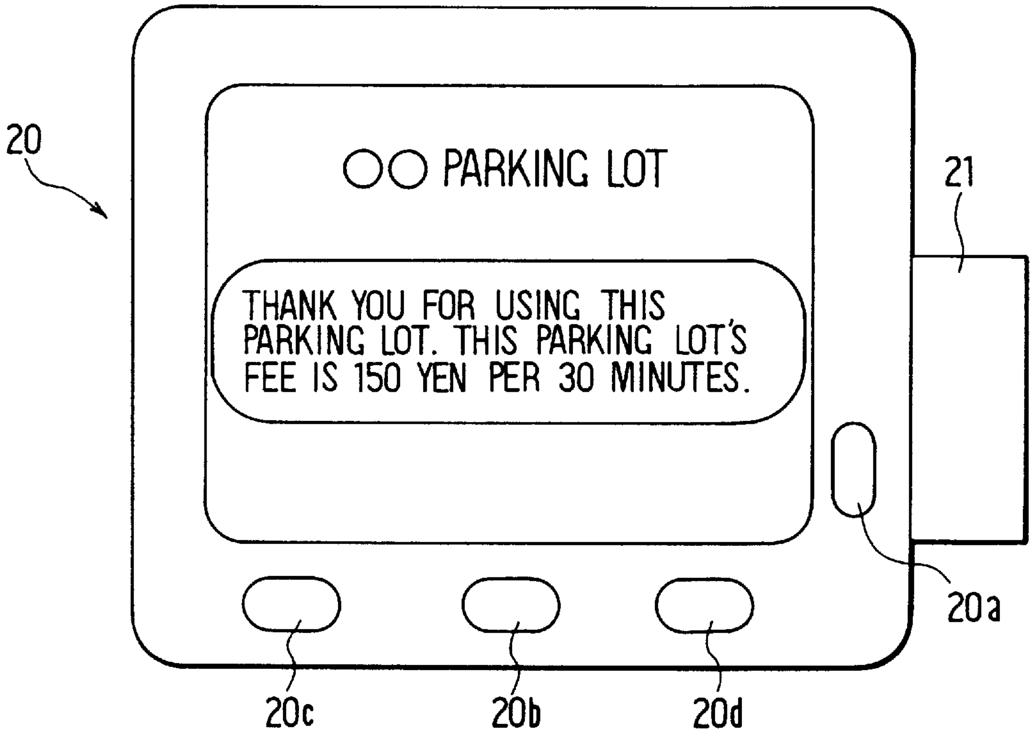
FIG. 23 shows a successful reservation-result display for a reserved vehicle in the embodiment.

When a completion message is received, it is determined from the completion message whether the reservation result was successful (step 307). When reservation is acceptable, the display apparatus 20 displays a successful reservation result as shown in FIG. 23, and along with this, the parking-site entry time is recorded on the IC card 21 (step 308) and a termination message is transmitted to the parking-site entrance overhead road device 4 (step 310).

Figure 24:
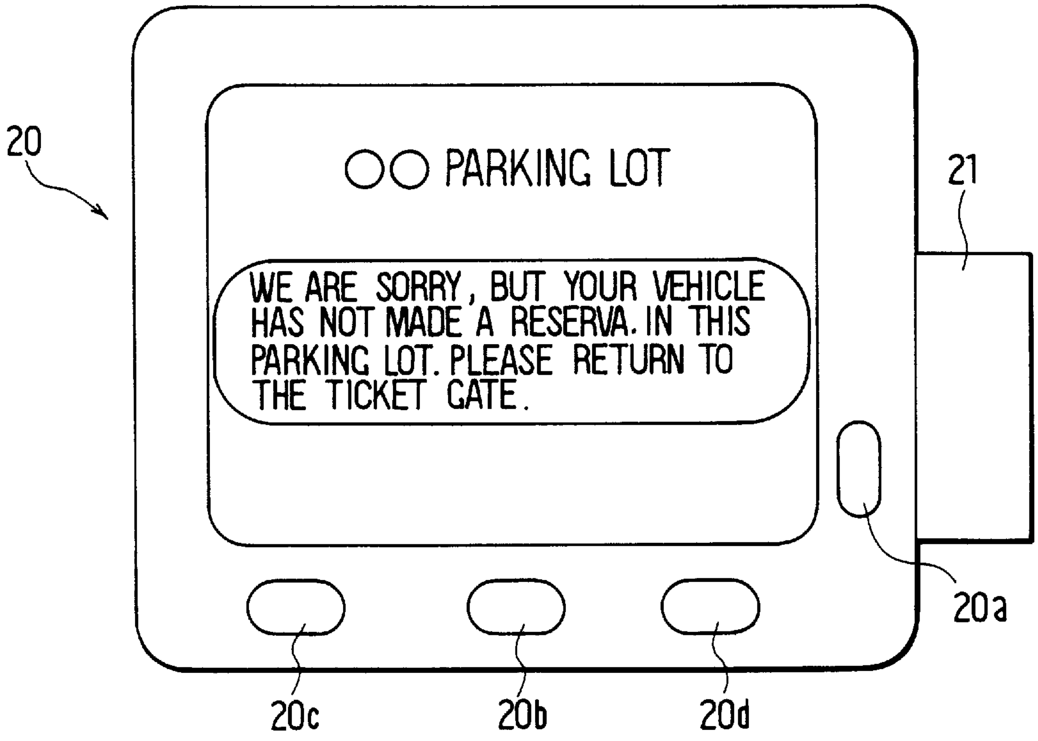
FIG. 24 shows an unsuccessful reservation-result display for a nonreserved vehicle in the embodiment.

When the reservation result is not successful, the display apparatus 20 performs an unsuccessful-reservation display as shown in FIG. 24 (step 309), and a termination message is transmitted to the parking-site entrance overhead road device 4 (step 310).

In a case where a signal from the parking-site entrance overhead road device 4 cannot be received even when awaited for a fixed time in the receive-standby processing of steps 302, 304, and 306, the sleep state is effected until a subsequent pilot signal is received.

(Control operation of the parking-site entrance overhead road device 4)

Figure 25:
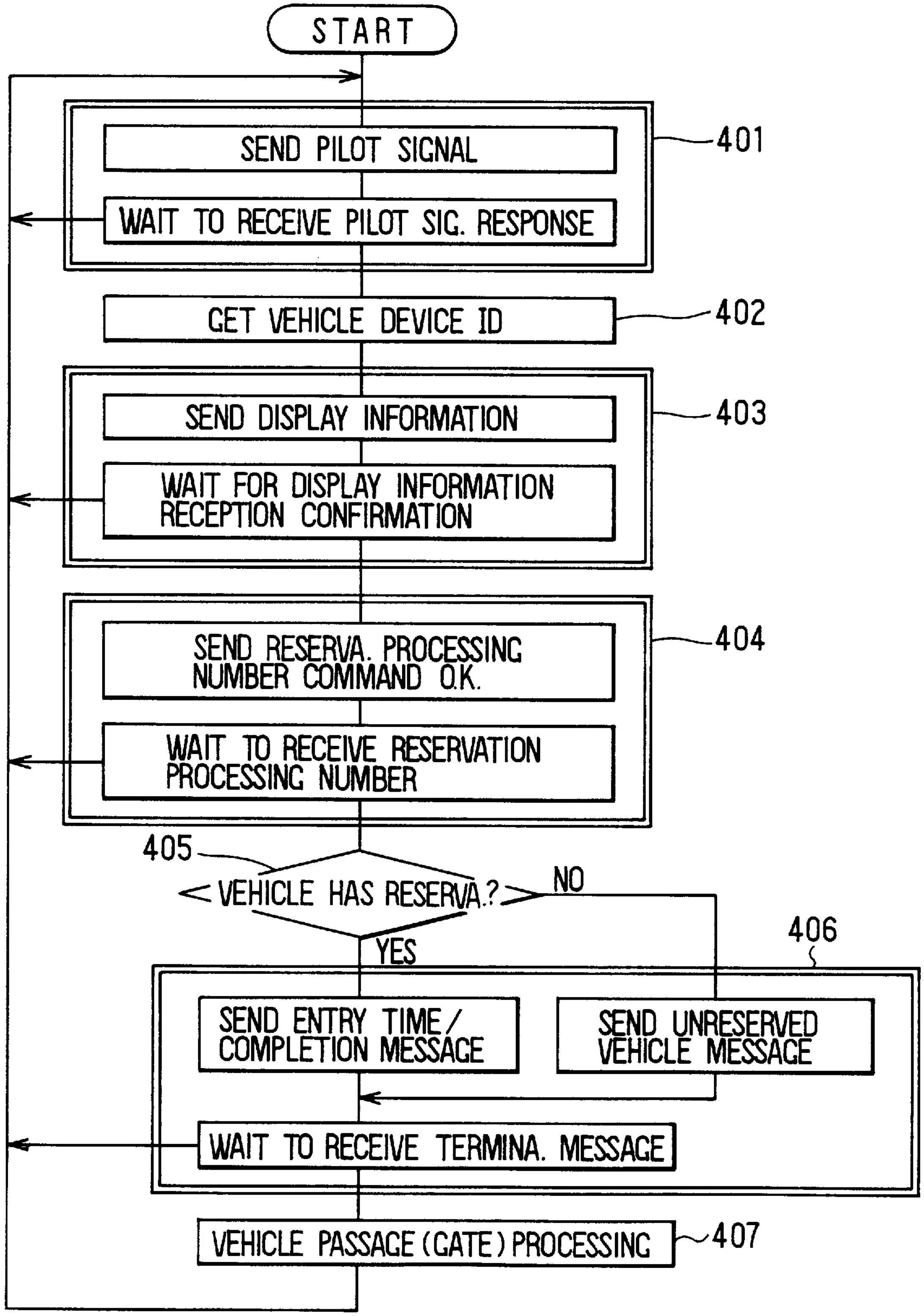
FIG. 25 is a flowchart showing control operation of a parking-site entrance overhead road device at a parking-site entrance in the embodiment.

The flowchart of FIG. 25 shows a control operation with the parking-site entrance overhead road device 4.

The parking-site entrance overhead road device 4 transmits a pilot signal to the vehicle-mounted device 2 and checks whether a pilot response signal has been received (step 401). When a pilot response signal is received, the vehicle-mounted device ID is read from the pilot response signal (step 402).

Accordingly, the parking-site entrance overhead road device 4 transmits display-use information toward this vehicle-mounted device 2, and awaits receipt of a display-use receipt confirmation signal (step 403).

When a display-use information receipt confirmation signal is received, a reservation processing-number transmission instruction is transmitted to the vehicle-mounted device 2 and receipt of a reservation processing number is awaited (step 404).

When a reservation processing number is received, comparison is performed against a reservation processing number which was previously sent, and it is determined whether the vehicle is a reserved vehicle (step 405). In a case where the vehicle has a reservation, a completion message including display information for the parking-site entry time and successful reservation result is transmitted to the vehicle-mounted device 2; in a case where the vehicle does not have a reservation, a completion message including an error message is translated to the vehicle-mounted device 2, and thereafter, termination-message standby is effected (step 406).

When a termination message is received, processing to cause the barrier device to be opened is performed in a case of a termination message from a reserved vehicle (step 407).

In a case where a signal from the vehicle-mounted device 2 cannot be received even when awaited for a fixed time in the receive-standby processing of steps 401, 403, 404, and 406, execution is returned to the pilot-signal transmission mode of step 401 and retransmission of the pilot signal is performed.

A mode of operation at a parking-site exit will be described next.

Figure 26:
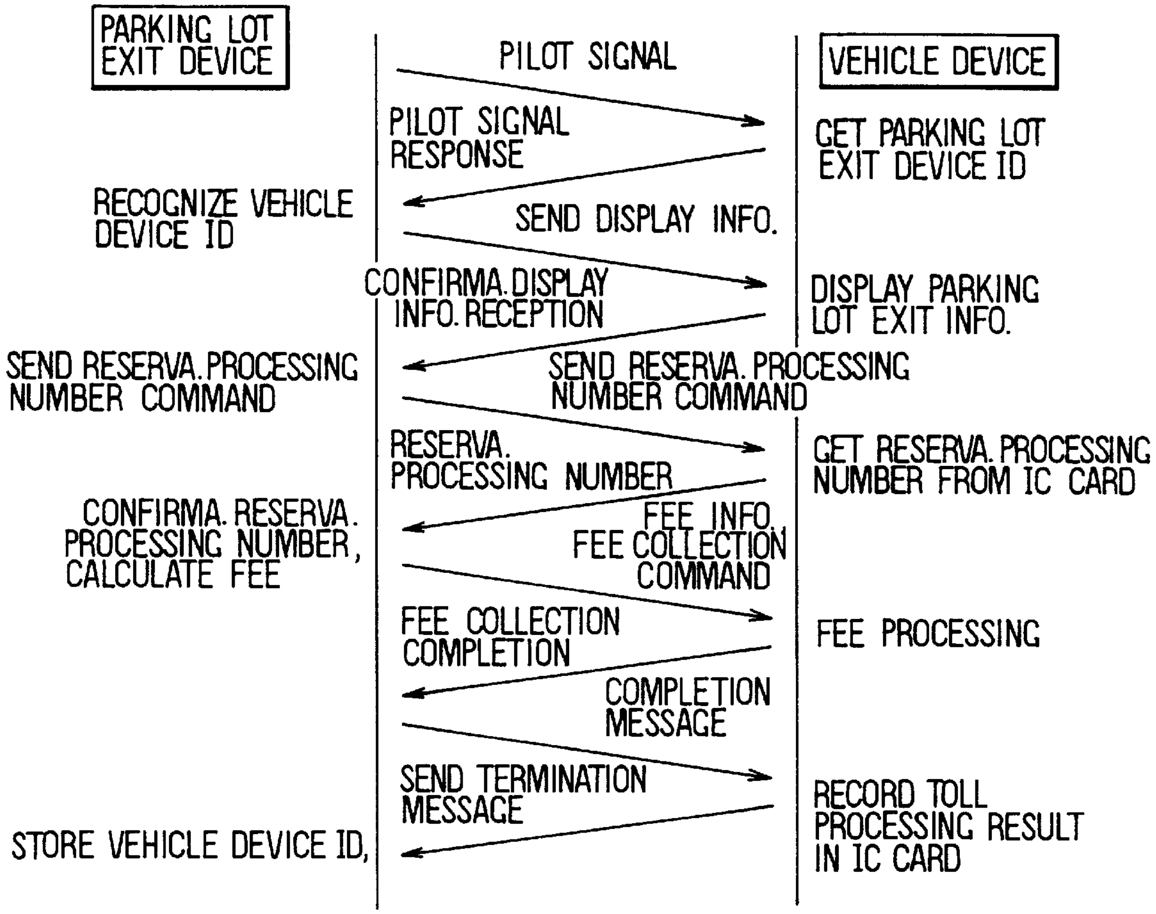
FIG. 26 shows communication flow of a parking-site exit overhead road device at a parking-site exit in the embodiment.

FIG. 26 shows an overview of the flow of communication of the parking-site exit overhead road device 5 and the vehicle-mounted device 2 at the parking-site exit.

The parking-site exit overhead road device 5 transmits a pilot signal. The vehicle-mounted device 2 reads the parking-site entrance overhead road-device ID from the pilot signal and transmits a pilot response signal to the parking-site exit overhead road device 5.

When the parking-site exit overhead road device 5 receives the pilot response signal from the vehicle-mounted device 2, the parking-site exit overhead road device 5 discriminates the ID of the vehicle-mounted device 2 and transmits display-use information. When the vehicle-mounted device 2 receives the display-use information, the vehicle-mounted device 2 conducts parking-site information display based on this display-use information and performs transmission to the parking-site exit overhead road device 5 to the effect that it was possible to receive the display-use information.

When the parking-site exit overhead road device 5 receives the display-use information receipt confirmation signal, the parking-site exit overhead road device 5 transmits a reservation processing-number transmission instruction to the vehicle-mounted device 2. The vehicle-mounted device 2 receives the reservation processing-number transmission instruction and transmits a reservation processing number.

When the parking-site exit overhead road device 5 receives the reservation processing number, the parking-site exit overhead road device 5 performs confirmation thereof with the reservation processing number which was previously sent, and performs collection processing for a parking fee. That is, parking-site usage time is calculated from the parking-site entry time and parking-site exit time, and fee information therefor and a fee-collection instruction are transmitted to the vehicle-mounted device 2. The vehicle-mounted device 2 performs fee processing on a basis of this fee information. In this case, processing to deduct the parking-site usage fee is performed when the IC card 21 is a card for prepayment use, i.e., a debit card, and processing to receive the parking-site usage fee is performed when the IC card 21 is a card for postpayment use, i.e., a credit card. Thereafter, the vehicle-mounted device 2 transmits a fee-collection completion signal to the parking-site exit overhead road device 5.

When the parking-site exit overhead road device 5 receives the fee-collection completion signal, the parking-site exit overhead road device 5 transmits a completion message to the vehicle-mounted device 2. When the vehicle-mounted device 2 receives the completion message, the vehicle-mounted device 2 records the result of the previously processed fee on the IC card 21 and transmits a terminal message to the parking-site exit overhead road device 5.

When the parking-site exit overhead road device 5 receives the termination message, the parking-site exit overhead road device 5 records the vehicle-mounted device ID and the fee-collection result, and performs processing to open the barrier device.

A specific control operation by the vehicle-mounted device 2 and by the parking-site exit overhead road device 5 at the above-described parking-site entrance will be described hereinafter.

(Control operation of the vehicle-mounted device 2 at the parking-site exit)

Figure 27:
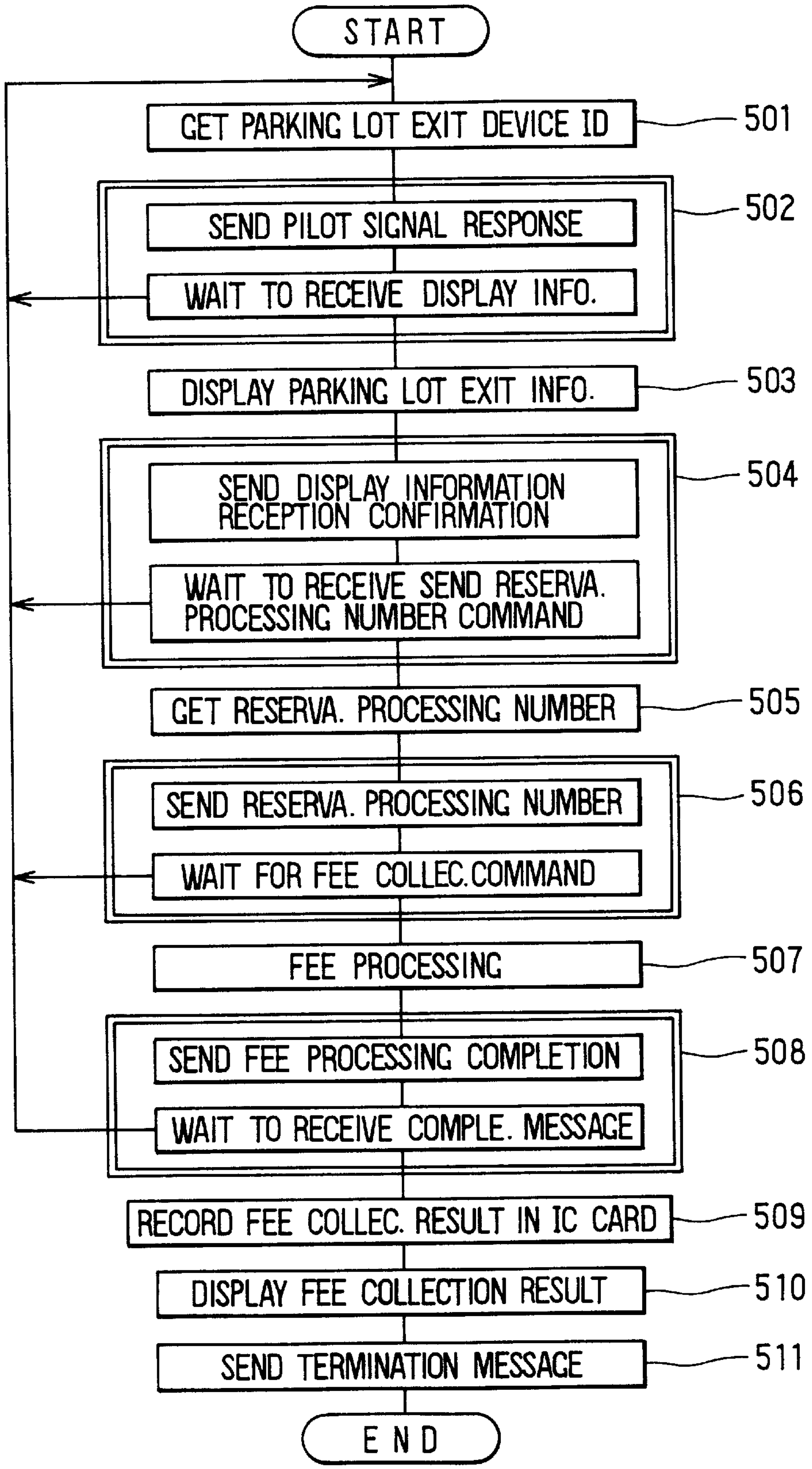
FIG. 27 is a flowchart showing control operation of a vehicle-mounted device at a parking-site exit in the embodiment.

The flowchart of FIG. 27 shows control operation with this vehicle-mounted device 2.

When the vehicle-mounted device 2 receives a pilot signal from the parking-site exit overhead road device 5, the vehicle-mounted device 2 enters an activated state and reads the parking-site exit overhead road-device ID from the pilot signal (step 501). Accordingly, a pilot response signal including the vehicle-mounted device ID as data is transmitted to the parking-site exit overhead road device 5, and receipt of display-use information from the parking-site exit overhead road device 5 is awaited (step 502).

Figure 28:
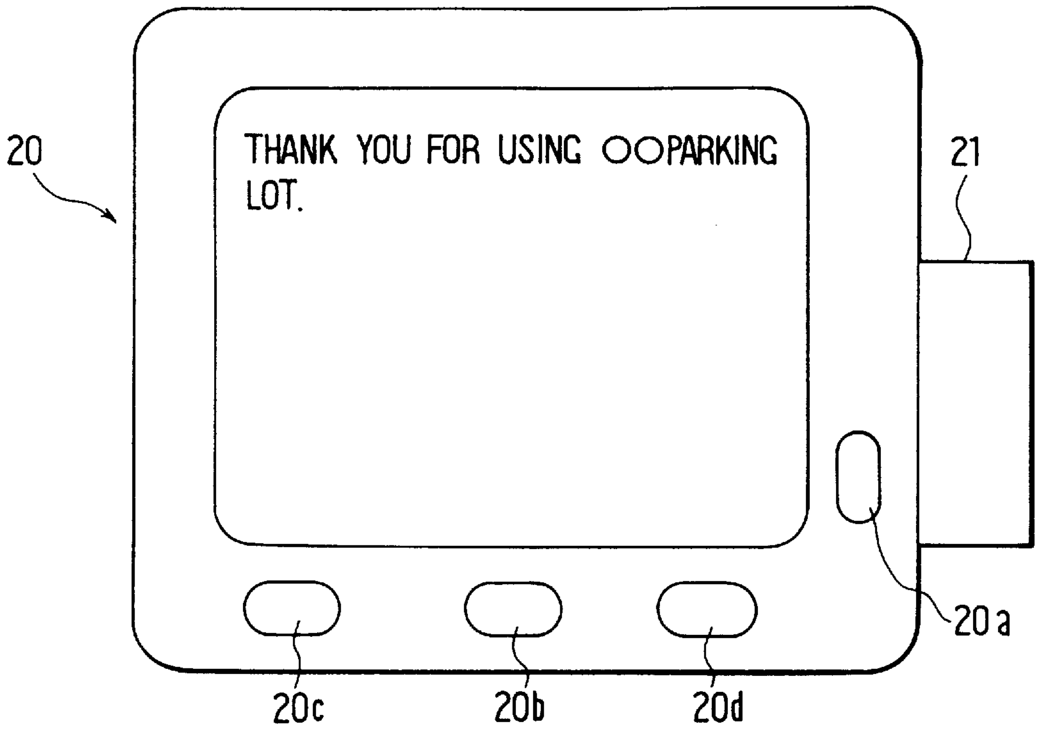
FIG. 28 shows a parking-site exit information display in the embodiment.

When display-use information is received, display of parking-site exit information as shown in FIG. 28 is performed on a basis of this display-use information (step 503). Accordingly, a display-use information receipt-confirmation signal is transmitted to the parking-site exit overhead road device 5, and a reservation processing-number transmission instruction from the parking-site exit overhead road device 5 is awaited (step 504).

When a reservation processing-number transmission instruction is received, the reservation processing number recorded on the IC card is read (step 505), the reservation processing number is transmitted to the parking-site exit overhead road device 5, and a fee-collection instruction is awaited (step 506).

When a fee-collection instruction is received, fee processing is performed based on fee information thereof (step 507), and when fee processing is completed, a fee-collection completion signal is transmitted to the parking-site exit overhead road device 5, and a completion message of the parking-site exit overhead road device 5 is awaited (step 508).

Figure 29:
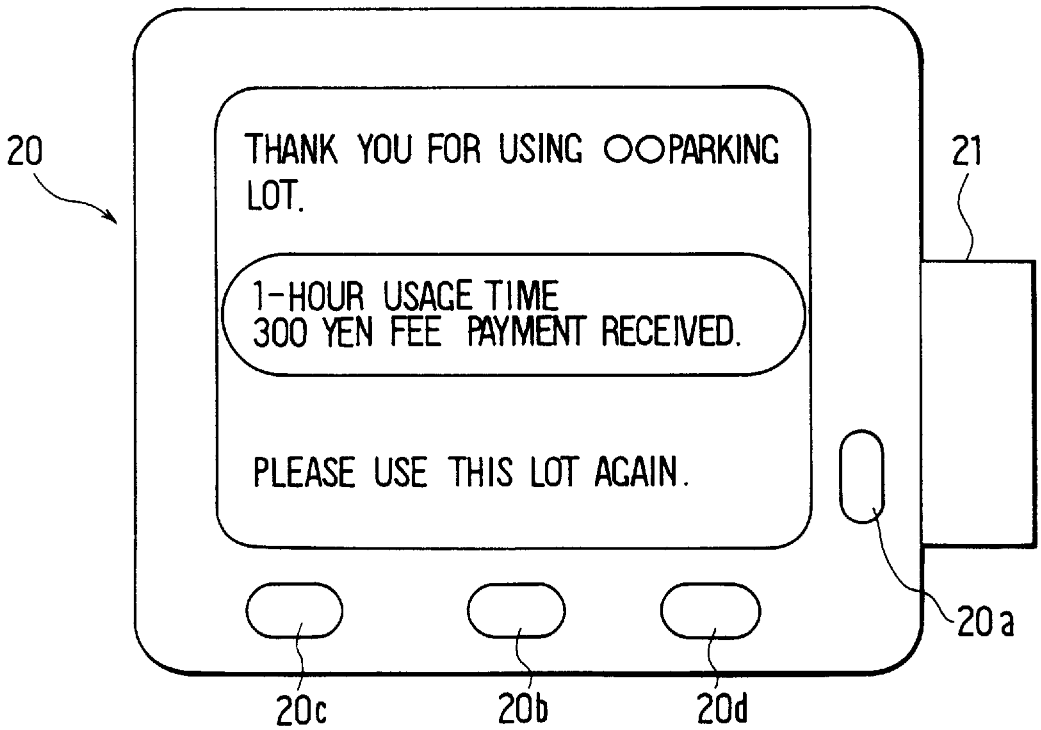
FIG. 29 shows a fee-collection result display in the embodiment.

When a completion message is received, it is determined from the completion message whether the reservation result was successful (step 507). When reservation is acceptable, the display apparatus 20 displays a successful reservation result as shown in FIG. 23, and along with this, the fee-collection result is recorded on the IC card 21 (step 509), and a fee-collection result as shown in FIG. 29 is displayed (step 510). Thereafter, a termination message is transmitted to the parking-site exit overhead road device 5 (step 511).

In a case where a signal from the parking-site exit overhead road device 5 cannot be received even when awaited for a fixed time in the receive-standby processing of steps 502, 504, 506, and 508, the sleep state is effected until a subsequent pilot signal is received.

(Control operation of the parking-site exit overhead road device 5)

Figure 30:
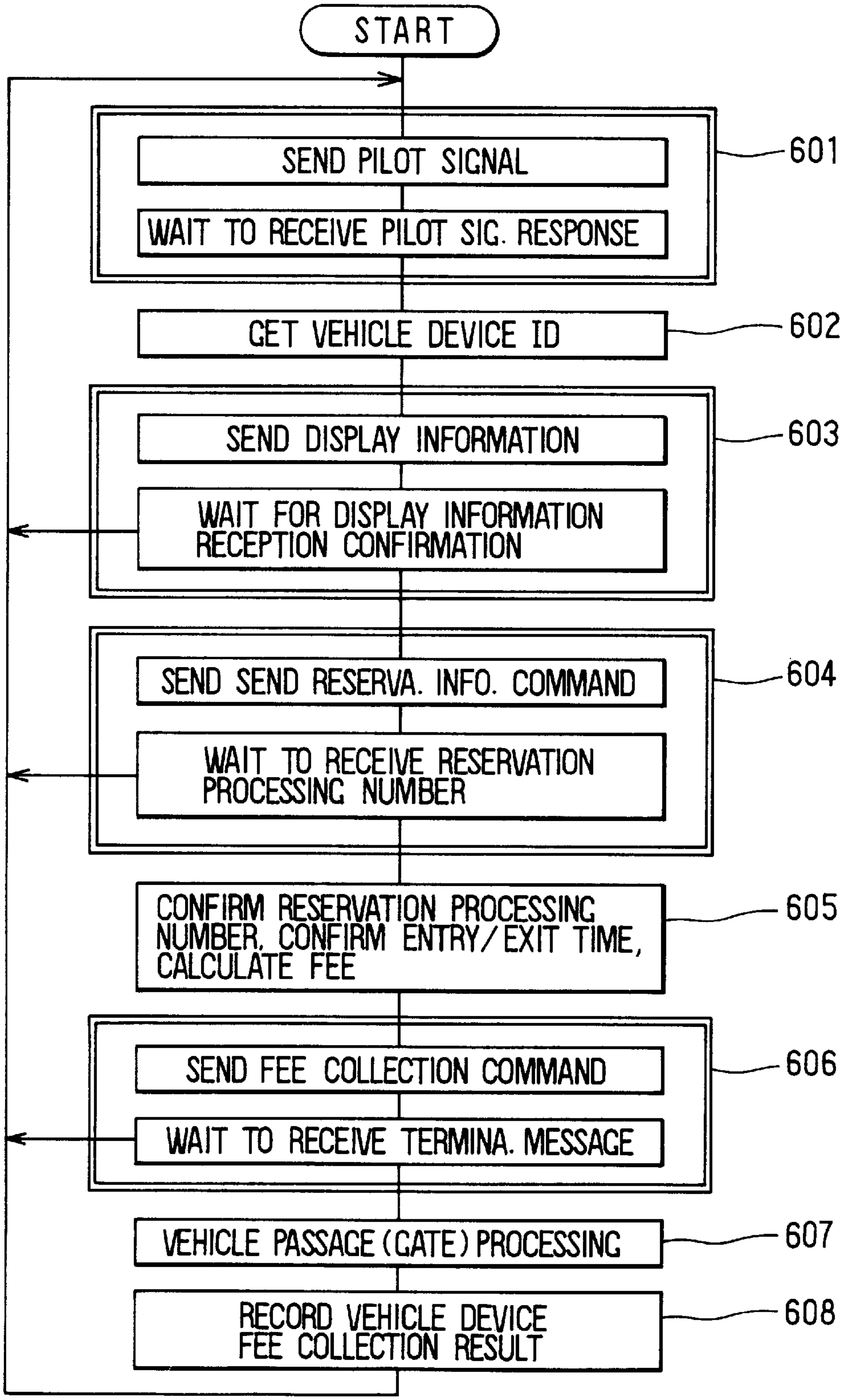
FIG. 30 is a drawing showing an overview of communication flow of a parking-site entrance overhead road device at a parking-site exit.

The flowchart of FIG. 30 shows a control operation with the parking-site exit overhead road device 5.

The parking-site exit overhead road device 5 transmits a pilot signal to the vehicle-mounted device 2 and, after transmission, checks whether a pilot response signal has been received (step 601). When a pilot response signal is received, the vehicle-mounted device ID is read from the pilot response signal (step 602).

Accordingly, the parking-site exit overhead road device 5 transmits display-use information to this vehicle-mounted device 2 and, after transmission, awaits receipt of a display-use receipt confirmation signal from the vehicle-mounted device 2 (step 603).

When a display-use information receipt confirmation signal is received, a reservation processing-number transmission instruction is transmitted to the vehicle-mounted device 2 and receipt of a reservation processing number is awaited (step 604).

When a reservation processing number is received, comparison is performed against a reservation processing number which was previously sent and confirmation thereof is performed, and parking-site usage time is calculated from the parking-site entry time and parking-site exit time (step 605). Accordingly, fee information therefor and a fee-collection instruction are transmitted to the vehicle-mounted device 2, and a termination message is awaited (step 606).

When a termination message is received, processing to open the barrier device is performed (step 607), and the vehicle-mounted device ID and the fee-collection result are recorded (step 608).

In a case where a signal from the vehicle-mounted device 2 cannot be received even when awaited for a fixed time in the receive-standby processing of steps 601, 603, 604, and 606, execution returns to the pilot-signal transmission mode of step 601 and retransmission of the pilot signal is performed.

Although the present invention has been fully described in connection with the preferred embodiments thereof with reference to the accompanying drawings, it is to be noted that various changes and modifications will become apparent to those skilled in the art.

For example, in the foregoing embodiment, a system providing a integrated control computer 7 to perform processing relating to reserving a parking site and displaying a state of road congestion was described, but a structure having no integrated control computer 7 which is capable of directly exchanging information by respectively communicating with several parking-site control computers 6 and overhead road devices 1 is also acceptable.

Further, the overhead road devices 1 and 3 through 5 are not exclusively limited to overhead road units, but may be buried units; in essence, the overhead road devices 1 and 3 may be any device along a road which can communicate with a vehicle-mounted device.

Also, the parking-site reservation control system may be integrated with the vehicle's navigation system. In this case, navigational maps may be displayed by the vehicle mounted unit as is known in the art, and when an overhead device signal is received, information therefrom is used to display parking sites on the map with emphasis, i.e., in a special display color. Moreover, a display scrolling technique such as the one described above in connection with FIG. 16 may be used to display the sites without user intervention when all information is not received from a single overhead device.

Further, although in the above-described embodiment the fee for using the parking site is actually charged to the vehicle-mounted device 2 by the parking-site exit overhead road device 5 when the vehicle exits the parking site, it is also possible that the charge is made by the integrated control computer 7 when the parking-site reservation is completed. Also, if the reservation is made far in advance, the fee may be charged by the integrated control computer 7 before the vehicle even enters the parking site, and the integrated control computer 7 may charge a penalty if the vehicle makes a reservation and then cancels it, or if the vehicle makes a reservation and fails to use the site at the reserved time.

Such changes and modifications are to be understood as being included within the scope of the present invention as defined by the appended claims.

What is claimed is:

1. A parking-site reservation control system comprising:

a vehicle-mounted device for requesting usage of a parking site by a vehicle in which the vehicle-mounted device is mounted;

a plurality of roadside units each disposed alone a roadway, each roadside unit having a communication area of a predetermined size that does not overlap with adjacent roadside unit communication areas, and that defines an area for communication between the respective roadside unit and the vehicle-mounted device, the plurality of roadside units including a first roadside unit disposed on a roadway for receiving a request from the vehicle-mounted device; and usage allocating means for receiving the request from the first roadside unit and for controlling a usage state of the parking site based on the request; wherein said system further comprising session continuation means for continuing communication with an adjacent one of the plurality of roadside units when the vehicle-mounted unit is no longer in a communication area of the first roadside unit and communication with the first roadside unit is not yet completed.

2. The system of claim 1, wherein:

the usage allocating means includes a parking-site controller at the parking site for receiving the request from the first roadside unit and for controlling the usage state of the parking site, and integrated control means for receiving the request from the parking-site controller and for controlling the parking-site controller;

the first roadside unit is connected to the parking site controller; and the integrated control means is for making a reservation for the vehicle at the parking site responsive to the request from the vehicle-mounted device.

3. The system of claim 2, wherein:

the vehicle-mounted device includes a display;

the integrated control means is for providing parking-site information indicating the usage state of the parking site to the first roadside unit; and the first roadside unit is for transmitting display data to the vehicle-mounted device to cause the usage state of the parking site to be displayed on the display according to the parking-site information.

4. The system of claim 3, wherein:

the integrated control means is further for providing congestion information on congestion of a road to respective parking sites to the first roadside unit; and the first roadside unit is for transmitting the display data to the vehicle-mounted device to cause the usage state of the parking site to be displayed on the display according to the parking-site information and the congestion information.

5. The system of claim 4, wherein the vehicle-mounted device is for displaying different levels of congestion of the road in correspondingly different colors.

6. The system of claim 4, wherein the integrated control means is further for providing congestion information including an identification code and coordinates of the road to the first roadside unit.

7. The system of claim 3, wherein the vehicle-mounted device comprises:

usage display means for displaying at least a parking-site usage state on the display based on the display data;

reservation request means for generating a reservation request for the parking site; and transmitting means for establishing a transmission session to transmit reservation information of a parking site for which a reservation has been established to the first roadside unit.

8. The system of claim 7, wherein the reservation request means is for generating the reservation request based on parking sites displayed on the display.

9. The system of claim 3, wherein the parking-site controller is for controlling usage of the parking site based on a number of vehicles entering the parking site and on a number of vehicles leaving the parking site.

10. The system of claim 3, wherein the integrated control means is further for providing the information on congestion of the road to the respective parking sites based on information from an external vehicle information communication system.

11. The system of claim 3, wherein the vehicle-mounted device is for indicating positions of at least two parking sites in an area displayed by the display.

12. The system of claim 11, wherein the vehicle-mounted device is further for indicating a position of a parking site to which a reservation request has been made differently from positions of other displayed parking sites.

13. The system of claim 3, wherein the vehicle-mounted device is for indicating positions of roadside units in an area displayed by the display.

14. The system of claim 13, wherein the vehicle-mounted device is further for indicating a position of a roadside unit which has sent parking-site information differently from positions of other displayed roadside units.

15. The system of claim 3, wherein the vehicle-mounted device is for displaying different levels of usage of the parking site in correspondingly different colors.

16. The system of claim 3, wherein the integrated control means is for providing parking-site information indicating an identification code and coordinates of the parking site to the first roadside unit.

17. The system of claim 3, wherein the first roadside unit is for confirming a reservation intention of the vehicle-mounted device, and for transmitting a confirmation intention transmission instruction to the vehicle-mounted unit responsive to the reservation intention.

18. The system of claim 17, wherein the first roadside unit is further for transmitting a reservation processing number to the vehicle-mounted unit after reservation processing.

19. The system of claim 1, wherein:

the usage allocating means is for providing reservation information to the vehicle-mounted unit via the first roadside unit;

the vehicle-mounted unit is for storing the reservation information;

the system further comprises a parking-site entrance transmitter, at an entrance of the parking site, for communicating with the vehicle-mounted device when the vehicle enters the parking site to perform a reservation confirmation based on the reservation information stored in the vehicle-mounted device, for determining whether the vehicle has a confirmed reservation based on the stored reservation information, and for authorizing usage of the parking site when the vehicle has the confirmed reservation.

20. The system of claim 19, further comprising a parking-site exit transmitter, at an exit of the parking site, for communicating with the vehicle-mounted device to perform collection processing for a parking fee.

21. A roadside unit for a parking-site reservation control system, the unit comprising:

means for receiving parking site usage information from an integrated controller; and means for transmitting parking site information based on the parking site usage information to a vehicle-mounted device mounted in a vehicle requesting use of the parking site;

the roadside unit having an associated vehicle-mounted device communication area and being positioned with other like roadside units so that communication areas of adjacent roadside units do not overlap; wherein said system further comprising session continuation means for continuing communication with an adjacent one of the plurality of roadside units when the vehicle-mounted device is no longer in a communication area of the first roadside unit and the transmission processing with the first roadside unit is not yet completed.

22. The unit of claim 21, wherein the session continuation means includes a timer that enables the continuation means to determine if accumulated communication time with the roadside unit has reached a predetermined established time so that communication can be interrupted with the roadside unit and re-established with the adjacent one of the like roadside units.

23. The unit of claim 21, further comprising updating means for selectively updating the parking site information at the vehicle-mounted device.

24. A vehicle-mounted device for a parking-site reservation control system, the device comprising:

usage request generation means for generating a usage request for a vehicle in which the vehicle-mounted device is mounted to use a parking site;

a transmitter for transmitting the usage request to a first roadside unit of a plurality of roadside units when the vehicle-mounted device is within a communication area of the first roadside unit;

a receiver for receiving information corresponding to the usage request from the first roadside unit; and a display for displaying indicia related to availability of a parking site for which a request has been transmitted; wherein said system further comprising session continuation means for continuing communication with an adjacent one of the plurality of roadside units when the vehicle-mounted device is no longer in the communication area of the first roadside unit and transmission processing with the first roadside unit is not yet completed.

25. The unit of claim 24, wherein the session continuation means includes a timer that enables the continuation means to determine if accumulated communication time with the first roadside unit has reached a predetermined established time so that communication can be interrupted with the first roadside unit and re-established with the adjacent one of the plurality of roadside units.

26. The unit of claim 24, further comprising updating means for selectively updating the indicia at the display.

27. A parking-site reservation control system comprising:

a vehicle-mounted device for requesting congestion information of a parking site from a vehicle in which the vehicle-mounted device is mounted, said vehicle-mounted device having a display;

a first roadside unit disposed on a roadway with other like roadway units and having a communication area, which does not overlap with adjacent communication areas of the other like roadside units, for communicating with the vehicle-mounted device and for receiving the congestion information request from the vehicle-mounted device; each roadside unit further comprising means for receiving parking site usage information from an integrated controller; and means for transmitting parking site information based on the parking site usage information to the vehicle-mounted device mounted in the vehicle requesting use of the parking site;

congestion information generating means for receiving the congestion information request from the roadside unit, for generating congestion information on the parking site based on the request, and for providing the information to the roadside unit;

wherein the roadside unit is further for transmitting display data to the vehicle-mounted device to cause a congestion state of the parking site to be displayed on the display according to the congestion information.

28. The system of claim 27, further comprising session continuation means for facilitating communication between the vehicle-mounted device and the roadside unit, and the other like roadside units, as the vehicle-mounted device moves from a communication area of the first roadside unit to a communication area of an adjacent one of the like roadside units and transmission processing with the roadside unit is not yet completed.

29. The unit of claim 28, wherein the session continuation means includes a timer that enables the continuation means to determine if accumulated communication time with the roadside unit has reached a predetermined established time so that communication can be interrupted with the roadside unit and re-established with the adjacent one of the like roadside units.

30. The unit of claim 27, further comprising updating means for selectively updating the display data on the display of the vehicle-mounted device.

* * * * *